United States Patent [19]
O'Neill et al.

[11] Patent Number: 5,877,164
[45] Date of Patent: Mar. 2, 1999

[54] PLANT RHAMNOGALACTURONAN II COMPLEXATION OF HEAVY METAL CATIONS

[75] Inventors: Malcolm A. O'Neill, Winterville, Ga.; Patrice J. M. Pellerin, Montpellier, France; Dennis Warrenfeltz, Athens, Ga.; Stéphane Vidal, Combaillaux, France; Alan G. Darvill; Peter Albersheim, both of Athens, Ga.

[73] Assignees: University of Georgia Research Foundation, Inc., Athens, Ga.; Institute National de la Recherche Agronomique, Paris, France

[21] Appl. No.: 755,058

[22] Filed: Nov. 22, 1996

[51] Int. Cl.$^6$ .......................... A61K 31/715; C07H 1/00; G01N 33/20
[52] U.S. Cl. .................................. 514/54; 514/64; 536/2; 536/123; 536/123.1; 436/79; 436/82
[58] Field of Search ........................... 514/54, 64; 536/2, 536/123, 123.1; 436/79, 82

[56] References Cited

PUBLICATIONS

Kobayashi et al. "Boron Nutrition of Cultured Tobacco BY–2 Cells. II. Characterization of the Borno–Polysaccharide Complex" *Plant Cell Physiol.* 38(6): 676–683 (1997).

Kobayashi et al. "Two Chains of Rhamnogalacturonan II Are Cross–Linked by Borate–Diol Ester Bonds in Higher Plant Cell Walls" *Plant Physiol.* 110:1017–1020 (1996).

O'Neill et al. *J. Biol. Chem.* Sep. 13, 1996, 271(37), 22923–30.

Matoh et al. *Plant Cell Physiol.* 1993, 34(4), 639–42.

Pellerin et al. *Carbohydrate Research* 1996, 290(2), 183–97.

*Primary Examiner*—Kathleen K. Fonda
*Attorney, Agent, or Firm*—Greenlee, Winner & Sullivan, P.C.

[57] ABSTRACT

The present invention provides rhamnogalacturonan-II (RG-II) and relates to its ability to complex specific multivalent heavy metal cations. In the presence of boric acid, RG-II monomers form dimers that are cross-linked by a borate ester. The yield of such borate ester cross-linked dimers of RG-II is enhanced in the presence of specific heavy metal cations. The present invention further relates to the utility of RG-II in assays for the detection of specific heavy metal contamination; as a reagent useful in the removal of specific heavy metal cations contaminating foods and liquids, for example, fish, wines, etc.; as a pharmaceutical composition useful as an antidote in specific heavy metal cation poisoning; as a treatment for the detoxification of specific heavy metal cations from blood and/or tissues; and in a method of remediation of waters and soils contaminated with specific heavy metal cations.

50 Claims, 8 Drawing Sheets

PLANT RHAMNOGALACTURONAN II COMPLEXATION OF HEAVY METAL CATIONS

ACKNOWLEDGEMENT OF GOVERNMENT FUNDING

The invention was partially made with Government support under Grant DE-FG05-93ER20097 and Grant DE-FG05-93ER20115, awarded by the U.S. Department of Energy. The United States Government has certain rights in this invention.

CROSS-REFERENCE TO RELATED APPLICATIONS

Not applicable.

FIELD OF THE INVENTION

The present invention relates generally to a rhamnogalacturonan-II (RG-II) and to its ability to complex specific multivalent heavy metal cations that may be toxic or radioactive. The present invention further relates to the utility of RG-II in methods for the detection and detoxification of specific heavy metal cation-contaminated milieu such as food, plasma, tissue, waters and soils.

BACKGROUND OF THE RELATED ART

Rhamnogalacturonan-II (RG-II) is a low molecular weight, structurally well-defined, complex pectic polysaccharide that is released from the walls of plant cells by treatment with endo-α-1,4-polygalacturonase [York et al. (1985) Methods Enzymol. 118:3–40]. RG-II has also been isolated from the cell walls of many plant cells, for example, sycamore (Acer pseudoplatanus) [Darvill et al. (1980) in *The Plant Cell* (N. E. Tolbert, ed.) Academic Press, New York, pp. 91–162], Douglas fir (*Pseudotsuga menziesii*) [Thomas et al. (1987) Plant Physiol. 83:659–671], rice (*Oryza sativa*) [Thomas et al. (1989) Carbohydr. Res. 185:261–277], onion (*Allium cepa*) [Stevenson et al. (1988) Carbohydr. Res. 179:269–288], kiwi fruit (*Actinidia deliciosa*) [Redgwell et al. (1991) Carbohydr. Res. 209:191–202], etc., and is present in the medium of cultured sycamore cells [Stevenson et al. (1986) Plant Physiol. 80:1012–1019], in the commercial enzyme preparation Pectinol AC [Spellman et al. (1983) Carbohydr. Res. 122:115–129], and in red wine [Doco et al. (1993) Carbohydr. Res. 243:333–343].

RG-II contains eleven different glycosyl residues [O'Neill et al. (1990) Methods Plant Biochem. 2:415–441], including the unusual monosaccharides apiose, 3-C-carboxy-5-deoxy-L-xylose (aceric acid), 3-deoxy-D-manno-octulosonic acid (Kdo), and 3-deoxy-D-lyxo-heptulosaric acid (Dha). RG-II also contains the seldom observed methyl-etherified sugars 2-O-methyl xylose and 2-O-methyl fucose. Many of the glycosidic linkages and ring forms of the glycosyl residues of RG-II, including β-D-galactosyluronic acid, β-L-arabinofuranose, α-L-arabinopyranose, and a fully substituted rhamnosyl residue, are also unusual. Some of the glycosyl residues in RG-II are O-acetylated. The backbone of RG-II has been shown to be composed of at least seven 1,4-linked α-D-galactosyluronic acid residues [Puvanesarajah et el. (1991) Carbohydr. Res. 218:211–222], schematically presented in FIG. 1.

A variety of oligosaccharide side chains are attached to the backbone [Stevenson et al. (1988) Carbohydr. Res. 182:207–226]. The carboxyl groups of some of the D-galactopyranosyluronic acid residues are esterified with methyl groups [Puvanesarajah et al. (1991) Carbohydr. Res. 218:211–222]. Partial acid hydrolysis of both native and O-permethylated RG-II have led to the isolation and structural characterization of oligosaccharide fragments of RG-II containing its glycosyl residues [York et al. (1985) Carbohydr. Res. 138:109–126; Stevenson et al. (1988) Carbohydr. Res. 182:207–226; Stevenson et al. (1988) Carbohydr. Res. 179:269–288; Puvanesarajah et al. (1991) Carbohydr. Res. 218:211–222; Spellman et al. (1983) Carbohydr. Res. 122:131–153; Melton et al. (1986) Carbohydr. Res. 146:279–305]. RG-II (see FIG. 1) has been shown to have the same structure in every plant from which it has been isolated.

RG-II isolated from radish roots [Kobayashi et al. (1996) Plant Physiol. 110:1017–1020; Matoh et al. (1993) Plant Cell. Physiol. 34:639–642] and from sugar beet [Ishii et al. (1996) Carbohydr. Res. 284:1–9] were found to contain borate esters. Boron is known to be an essential microelement for normal plant growth and development [Loomis et al. (1992) BioFactors 3:229–239; Hu et al. (1994) Plant Physiol. 105:681–689; Shelp et al. (1995) Physiol. Plant 94:356–361; Welch (1995) Crit. Rev. Plant Sci. 14:49–82]. Boron deficiency, which first becomes apparent in growing tissues, results in disorganized cell expansion and the formation of cell walls with abnormal morphology [Loomis et al. (1992) BioFactors 3:229–239]. Growing plant cells require a constant supply of exogenous boron because the majority of boron in plant tissues is present in a "nonavailable" form [Loomis et al. (1992) BioFactors 3:229–239; Hu et al. (1994) Plant Physiol. 105:681–689; Brown et al. (1994) Physiol. Plant 91:435–441]. Boron is believed to form borate-diol esters that covalently crosslink cell wall pectic polysaccharides (Kobayashi et al. (1996) Plant Physiol. 110:1017–1020; Matoh et al. (1993) Plant Cell Physiol. 34:639–642; Ishii et al. (1996) Carbohydr. Res. 284:1–9]. Also, borate ester cross-linking of polysaccharides in vitro has been shown to be pH-dependent [Deuel et al. (1954) in Natural Plant Hydrocolloids [Adv. Chem. Series No. 11] pp. 51–61, American Chem. Society, Washington, D.C.]. Thus, it has been suggested that boron cross-links are the "load-bearing", acid-labile linkages that are hydrolyzed by a decrease in cell wall pH during auxin-induced cell expansion [Loomis et al. (1992) BioFactors 3:229–239]. RG-II is the only boron-containing polysaccharide that has been isolated from a biological source.

Contamination of the environment with heavy metal ions and/or alkyl and thiol derivatives of metals has increased over the last several decades, with toxic levels of the contaminants being reached in air, water and/or soil in certain locations. Contamination may stem from human and industrial sources. Heavy metals are an increasing problem in the sludge produced by industries and populations centers [Adriano (1986) "Trace elements in the terrestrial environment," New York, Springer Verlag; Alloway (1990) "Heavy metals in soils" New York, John Wiley & Sons]. The wind borne residue of volatile metals have contaminated land at great distances from smelting operations, rendering it useless [Lepp (1981) "Effects of heavy metal pollution on plants" In Appl. Sci. Editor, Applied Science Publishers, New Jersey 12]. Land in some parts of the globe such as the western United States [Cannon (1960) "The development of botanical methods of prospecting for uranium on the Colorado Plateau," U.S. Geol. Surv. Bull. 1085A:1–50], and Africa [Brooks and Malaisse (1985) *The Heavy Metal-tolerant Flora of South Central Africa*, A. A. Balkema Press, Boston, Mass.] is naturally contaminated with high levels of a variety of toxic metals including arsenic, cadmium, copper, cobalt, lead, mercury, selenium and/or zinc. A major concern is the ability to dispose of wastes containing toxic heavy metals generated by weapons production facilities, power generation plants, mining and the metal fabrication industries. Stabilizing and reducing the mass of the toxic metals contained in such wastes would facilitate their disposal.

These heavy metals are often found in soil and marine sediments as heavy metal salts (e.g., thiol salts), as chelates with acidic humic substances (for example, methylmercury), and to a lesser extent other organocationic species, and as free multivalent cations. Some heavy metals cycle through the aqueous phase and into the atmosphere as volatile elemental cations, free or complexed, and are then oxidized and washed by rain into the marine environment [Barkay et al. (1992) *Biodegradation* 3:147–159]. Some bacteria in soil and sediments can detoxify heavy metal cations by reducing them to their metallic forms. Heavy metals are often found bound in the form of organocomplexes in contaminated animals and microbes [Barkay et al. (1992) supra; Robinson and Tuovinen (1984) *Microbiological Reviews* 48:95–124]. In fish, where heavy metal toxicity is well studied, most of the tissue-associated heavy metals are found as organocomplexes [Pan Hou and Imura (1987) *Arch. Microbiol.* 131:176–177]. Heavy metal organocomplexes may be volatile and extremely toxic to plants and, generally, to the environment [D'Itri and D'Itri (1987) *Environ. Management* 2:3–16].

With global heavy metal contamination on the increase [Nriagu and Pacyna (1988) Nature 333:134–139], plants which can process heavy metals might provide efficient and ecologically sound solutions. Regions which are naturally contaminated with heavy metals are often characterized by scrubby heavy-metal tolerant vegetation [Brooks and Malaisse (1985) *The Heavy Metal-tolerant Flora of South Central Africa*, A. A. Balkema Press, Boston, Mass.; Wild, H. (1978) "The Vegetation of Heavy Metal and Other Toxic Soils," in *Biogeography and Ecology of Southern Africa*, Wergren, M. J. H., ed., Junk, The Hague, Netherlands]. Certain of these naturally occurring metal-resistant plants hyperaccumulate large amounts of heavy metals in the form of malate or citrate chelates. These plants have been found in a variety of habitats, but often they exhibit bizarre metal ion requirements, grow poorly in less exotic habitats, and are of little direct economic value as crop or forest species.

There is a long felt need in the art for the in situ detection and detoxification of toxic heavy metal ions and/or heavy metal complexes in human and animal applications and in their environment. The present invention provides an assay to detect specific heavy metal cations and a method to complex such, and enables phytoremediation and/or revegetation of contaminated environments via plants and plant components capable of heavy metal cation complexation and sequestration.

SUMMARY OF THE INVENTION

It is an object of the invention to provide a complex pectic polysaccharide, rhamnogalacturonan-II (RG-II), isolated and purified from plant sources by endopolygalacturonase treatment of plant cell walls or from products of processed fruits and vegetables. In specific embodiments of the invention, RG-II was isolated from cell walls of sycamore, pea and red wine as a mixture of a boron-free monomer (mRG-II) and a boron-containing dimer (dRG-II-B). The chromatographically resolved monomer had a molecular weight of approximately 4.9 kDa whereas the dimer possessed a molecular weight of approximately 9.8 kDa. The molecular structure of RG-II is provided in FIG. 1. The glycosyl residue compositions for RG-II monomer and dimer were indistinguishable. The detection of a unique saccharide such as aceric acid in a plant component identifies the component as being RG-II.

It is another object of the invention to provide a borate ester crosslinked dimer of RG-II. Isolated dimeric RG-II contains between 1 and 2 mole of boron per mole of dimer, whereas isolated monomeric RG-II contains <0.05 mole of boron per mole of mRG-II. In particular embodiments, dRG-II-B, but not mRG-II, was shown to contain a 1:2 borate-diol ester. The borate ester in dRG-II-B was found to be attached to two of the four apiosyl residues. The borate ester in dRG-II was stable above pH 4.

It is a further object of this invention to provide a method for dimerization of monomeric RG-II. According to the method of the invention, dRG-II-B was formed in vitro when mRG-II was incubated with boric acid at a pH between approximately 2.2 and 4.5, and preferably between approximately 2.8 and 3.7, and more preferably between approximately 3.0 and 3.4. When mRG-II was incubated for 24 hours at pH 3.1 in the presence of boric acid, approximately 30% of the RG-II was dimerized.

As provided in particular embodiments, the extent of mRG-II dimerization was enhanced in the presence of specific multivalent heavy metal cations. When mRG-II is incubated with boric acid in the presence of specific heavy metal cations, greater than 85% of the mRG-II is converted to the dimeric form. The present invention provides, therefore, a complex formed between a specific multivalent heavy metal cation and a dimer of RG-II or a complex between a specific heavy metal cation and RG-II formed during the dimerization of monomeric RG-II in the presence of boric acid and specific heavy metal cations.

It is yet a further object of the invention to provide a method for the complexation of a heavy metal cation with RG-II. Monomeric RG-II incubated in the presence of boric acid and specific heavy metal cations at a pH between approximately 2.2 and 6.5, and preferably between approximately 3.0 and 5.0, formed a cation-dRG-II-B complex. The cations bound to the dRG-II-B were not directly complexed to the borate ester moiety, but formed metal coordination complexes with dRG-II-B. According to the invention, the method for the complexation of heavy metal cations can also be carried out with the dimeric form of RG-II (i.e., dRG-II-B). However, complexation is more complete with the utilization of monomeric RG-II and boric acid than with dimeric RG-II.

The invention further provides specific heavy metal cations capable of forming complexes with RG-II. According to the invention, the heavy metal cations capable of complexation with RG-II comprise physical and chemical properties that include, but are not limited to, (a) a valence of 2+ or 3+, (b) a crystal ionic radius of >0.9 Å, (c) an electronic configuration with an incompletely filled subshell and (d) an ionization energy that is low and associated with a low ionic potential. Such heavy metal cations capable of complexation with RG-II include, but are not limited to, metals, earth metals, lanthanides, actinides, etc., and are exemplified by cations such as $Ba^{2+}$, $Ce^{3+}$, $Eu^{3+}$, $La^{3+}$, $Pb^{2+}$, $Pr^{3+}$, $Sr^{2+}$ and the like. In particular embodiments of the invention, cation-RG-II complexes comprise approximately 1 mole of divalent cation per mole of dRG-II; in other embodiments, cation-RG-II complexes comprise approximately 2 mole of trivalent cation per mole of dRG-II.

Thus, it is also an object of the invention to provide an assay for the detection of a heavy metal cation possessing the ability to form a complex with RG-II. This assay measures the difference in ratio of RG-II dimer to RG-II monomer after incubation of monomeric RG-II and boric acid in the presence and absence of said heavy metal cation. An increase in the ratio of dimer to monomer RG-II correlates with the ability of the heavy metal cation to form a complex with dimeric RG-II.

It is another object of the invention to provide a method for the decontamination or removal of multivalent heavy metal cations from a medium contaminated with such cations. In a particular embodiment, wine was decontaminated of a heavy metal cation (lead). Removal of latent RG-II complexes in the wine by adsorption or anion-exchange chromatography or by filtration resulted in a concomitant removal of lead in the form of lead-RG-II complexes. The lead contents of different types of wine were reduced by approximately 89% to 97%.

In other embodiments, wine (or other solution) was contaminated with lead (or other heavy metal cation) and then treated with monomeric RG-II in the presence of boric acid (or with a borate ester crosslinked RG-II dimer) for a time sufficient to allow formation of cation-RG-II complexes between the cation (e.g., lead) and dimers of RG-II. The resultant cation-RG-II complexes were removed from the wine (or other contaminated solution) either chromatographically or by filtration. When the lead-contaminated solution was treated with monomeric RG-II and boric acid, the residual lead content of the solution was either 0% or was decreased to between 0% and approximately 11%, depending on the means used to remove the lead-RG-II complexes from the solution. When the lead-contaminated solution was treated with dimeric RG-II, the residual lead content of the solution was decreased to between approximately 5% and 29%. Removal of heavy metal cations from a contaminated medium appeared to be more effective with monomeric RG-II and boric acid than with dimeric RG-II.

It is an additional object to provide a chelating agent that is selective and can be used to advantage to complex only specific heavy metal cations. According to the invention, RG-II can be used for human and other indications to complex, sequester and remove specific heavy metal cations such as $Ba^{2+}$, $Ce^{3+}$, $Eu^{3+}$, $La^{3+}$, $Pb^{2+}$, $Pr^{3+}$, $Sr^{2+}$, etc., without also complexing and removing such cations as $Ca^{2+}$, $Mg^{2+}$, $Mn^{2+}$, etc. This property of cation selectivity permits RG-II to be used preferentially, when compared with general cation chelators such as EDTA, etc., for the exclusive sequestration of specific heavy metal cations, for example, in cases of heavy metal poisoning, radioactive contaminations, etc.

It is an additional object of the invention to provide RG-II as an antidote and a method of treatment for specific heavy metal poisoning in humans and animals by virtue of the ability of RG-II to complex toxic heavy metal cations contaminating plasma and tissues. Plasma may also be detoxified of specific heavy metal cations by ex vivo treatment with RG-II. The resultant cation-RG-II complexes, being non-digestible in higher animals, are eliminated naturally from the body. Further, in accordance with the invention, these methods for complexation and sequestration of specific metal cations with monomeric and/or dimeric RG-II are applied, for example, to the decontamination and/or detoxification of specific heavy metal cation-contaminated foods used for human and animal consumption. Complexation of heavy metal cations with RG-II effectively eliminates the toxicity associated with the ingestion and assimilation of these heavy metal cations in the gastrointestinal tract.

It is also an object of the invention to provide a pharmaceutical composition comprising purified RG-II monomer and/or dimer. It is an additional object to provide a chemical reagent comprising a partially purified RG-II monomer and/or dimer.

The invention also provides a dRG-II-B-cation complex, wherein the cation is a multivalent specific heavy metal cation of the invention and includes exemplified cations such as $Ba^{2+}$, $Ce^{3+}$, $Eu^{3+}$, $La^{3+}$, $Pb^{2+}$, $Pr^{3+}$, $Sr^{2+}$ and the like, and wherein, for example, a complex comprises ~1 mole of a divalent cation or 2 mole of a trivalent cation per mole of dRG-II-B. Such a dRG-II-B-cation complex of the invention is useful in human and animal applications as a non-toxic complex for the delivery of the specific heavy metal cation to target cells and tissues or, in general applications, as a cation exchanger. In specific exemplifications, a $Ba^{2+}$-dRG-II-B complex can be used as a barium carrier; a $La^{3+}$-dRG-II-B complex is useful as a water-soluble chemical shift reagent for NMR spectroscopy, etc. It is further contemplated by the invention that the dRG-II-B is useful as a non-toxic complex for boron neutron capture therapy. Also, the invention contemplates the use of a dRG-II-B-cation complex as an ionophoric antibiotic by virtue of the toxicity inherent in specific heavy metal cations to microorganisms.

Further, the invention provides a method of bioremediation, based on the ability of plants to take up specific heavy metal cations which become complexed with endogenous RG-II synthesized in vivo as a cell wall component.

BRIEF DESCRIPTION OF THE DRAWINGS

FIG. 2A shows the elution profile of sycamore RG-II. The peaks labeled I and II were collected manually, and their glycosyl residue compositions (Table 1) were determined by GLC analysis of their TMS methyl glycoside derivatives. Fraction I corresponds to dRG-II-B and Fraction II corresponds to mRG-II. FIG. 2B shows the elution profile of etiolated pea stem RG-II. The dRG-II-B (peak I) was collected manually, and its glycosyl residue compositions were determined by GLC analysis of its TMS methyl glycoside derivatives (Table 1). FIG. 2C shows the elution profile of red wine RG-II. The glycosyl residue composition of red wine mRG-II was determined, without purification on the SEC column, by GLC analysis of its TMS methyl glycoside derivatives (Table 1). The SEC column was eluted at 0.6 ml/min with 25 mM ammonium formate, pH 5.2, and the eluant monitored with a Hewlett-Packard 1037A refractive index detector (×16 attenuation). The column void volume (~13.5 min) was determined with a dextran standard (25 kDa) and the column-included volume (~34 min) determined with glucose. FIG. 2D shows the elution profile of RG-II prepared on a large scale from red wine. Two RG-II peaks were eluted from Superdex 75 HR 10/30 SEC: peak A, comprising approximately 90% of the dimer preparation and peak B, containing approximately 98% of the monomer preparation.

FIG. 3A shows the structure of a 1:1 borate-diol ester (I), a 1:2 borate-diol ester (II), and a 1:1 boric acid-diol ester (III). These are the expected products of the reaction of borate and of boric acid with cis-diols. The $^{11}$B signals (relative to boric acid at $\delta$ 0.0) of I, II, and III are $\delta$ −11.5 to −14.5, $\delta$ −8.0 to −10.5, and $\delta$ 0.0 to 0.4, respectively. FIG. 3B shows the $^{11}$B NMR spectrum of sycamore dRG-II-B (Fraction I in FIG. 2A). FIG. 3C shows the $^{11}$B NMR spectrum of pea dRG-II-B (Fraction I in FIG. 2C).

FIG. 4A shows the effects of pH on the amount of dRGII-B formed after 24 hours (●) and 72 hours (■) when red wine mRG-II (0.5 mM) is reacted, between pH 1.5 and 9, with boric acid (1.2 mM). The amount of dRG-II-B formed was determined by SEC. FIG. 4B shows the effects of buffers between pH 2.7 and 4 on the amount of dRG-II-B formed after 24 hours when red wine mRG-II (0.5 mM) is reacted with boric acid (1.2 m). FIG. 4C shows the effects of buffers between pH 1 and 7 on the amount of dRG-II-B formed after 24 hours when red wine mRG-II (0.5 mM) is reacted with boric acid (1.2 mM) and 0.5 mM $SrCl_2$ (▲) or 0.5 mM $Pb(NO_3)_2$ (▲).

FIG. 5A shows the amount of dRG-II-B formed after 24 hours at pH 3.7 by reacting red wine mRG-II (0.5 mM) with boric acid (1.2 mM) and selected divalent cations (0.5 mM). The amount of dRG-II-B formed was determined by SEC. The values shown above each bar represent the crystal ionic radius (in Å) of the divalent cation. FIG. 5A shows the amount of dRG-II-B formed after 24 hours at pH 3.7 (dark bars) or pH 5.3 (gray bars) when sycamore mRG-II (0.5 mM) is reacted with boric acid (1.2 mM) in the presence of the indicated divalent cations (0.5 mM each). The amount of dRG-II-B formed was determined by SEC.

DETAILED DESCRIPTION OF THE INVENTION

The following definitions are provided to remove any potential ambiguities as to the intent or scope of their usage in the specification and claims.

Figure 1:
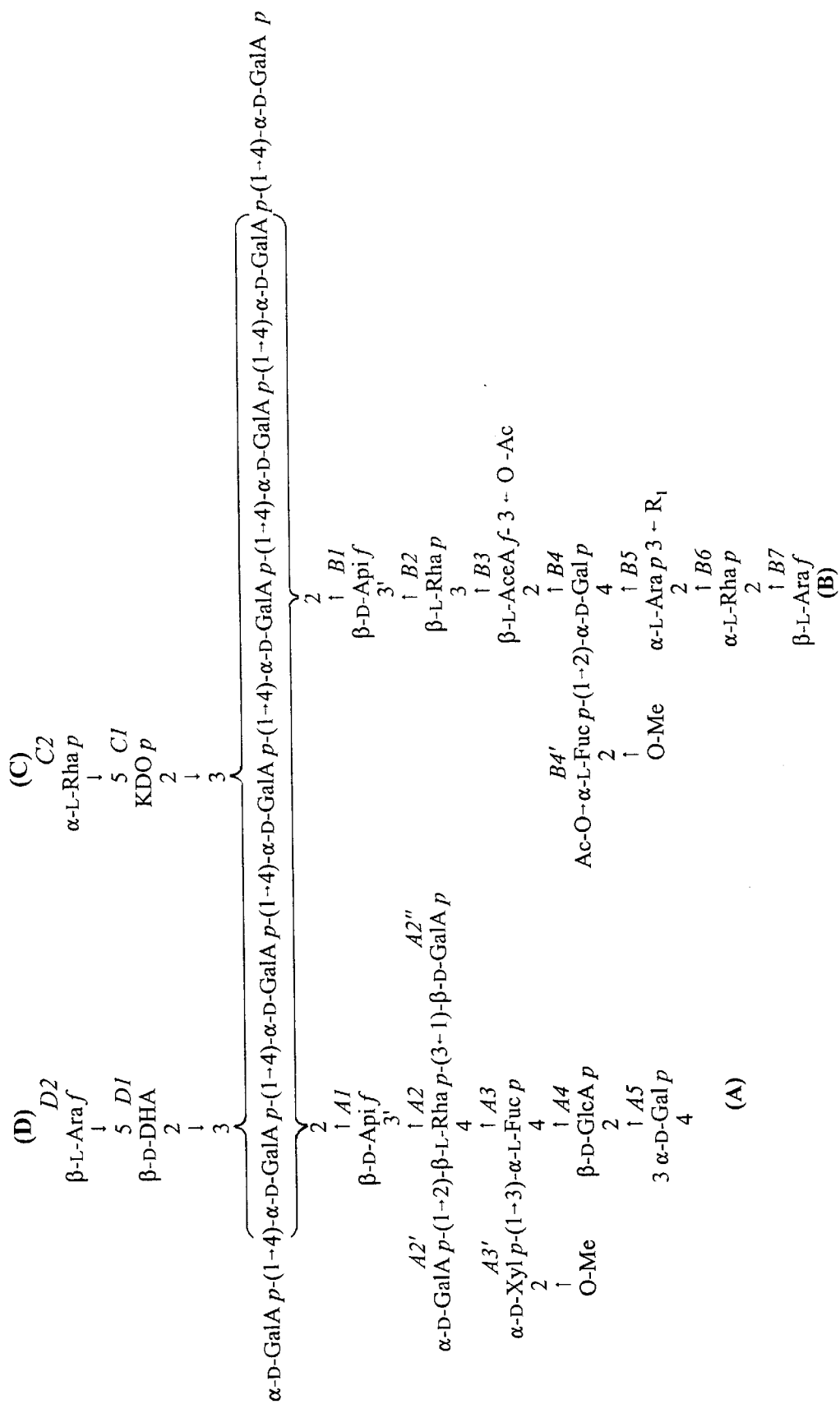
FIG. 1. is a scheme showing the partial structure of RG-II. The backbone of endopolygalacturonase-released RG-II is composed of nine 1,4-linked α-D-galactosyluronic acid residues to which four side chains are attached. The order in which the side chains are attached has not been determined, although it is known which ones are attached to O-2 and O-3 of the galactosyluronic acid residues. In this figure, the backbone galactosyluronic acid residues to which the four side chains [designated as (A), (B), (C) and (D)] are attached have been arbitrarily assigned. $R_1$=H, α-L-Rha ρ. The abbreviations used are AcefA, 3-C-carboxy-5-deoxy-L-xylofuranosyl; Apif, apiofuranosyl; Araf, arabinofuranosyl; Arap, arabinopyranosyl; Dhap, 3-deoxy-D-lyxo-heptulopyranosylaric acid; Fucp, fucopyranosyl; Galp, galactopyranosyl; GalpA, galactopyranosyluronic acid; GlcpA, glucopyranosyluronic acid; Kdop, 3-deoxy-D-manno-octulopyranosylonic acid; 2-O-MeFucp, 2-O-methylfucopyranosyl; 2-O-MeXylp, 2-O-methylxylopyranosyl; Rhap, rhamnopyranosyl; OAc, O-acetyl.

The term rhamnogalacturonan-II or RG-II, as used herein, refers to a molecule having the molecular structure of FIG. 1. RG-II is a substituted 1,4-linked α-D-galacturonan wherein two different oligosaccharide side chains are attached at the 2-position of two different 4-linked galacturosyluronic acid residues and wherein two different oligosaccharide side chains are attached at the 3-position of two different 4-linked galactosyluronic acid residues. These four oligosaccharide side chains are illustrated in FIG. 1 as follows:

An oligosaccharide (A), attached at the 2-position of a 4-linked galacturosyluronic acid residue is composed of a 3'-linked β-D-apiofuranosyl residue, a 2,3,4-linked β-L-rhamnopyranosyl residue, a 3,4-linked α-L-fucopyranosyl residue, a terminal non-reducing α-D-galactopyranosyl residue, a terminal non-reducing 2-O-methyl α-D-xylopyranosyl residue, a terminal non-reducing α-D-galactopyranosyluronic acid residue, a terminal non-reducing β-D-galactosyluronic acid residue, and a 2-linked β-D-glucopyranosyluronic acid residue. The glycosyl residues are linked together as shown in FIG. 1 at A.

An oligosaccharide (B), attached at the 2-position of a 4-linked galacturosyluronic acid residue, is composed of a 3'-linked β-D-apiofuranosyl, a 3-linked β-L-rhamnopyranosyl residue, a 2-linked 3-C-carboxy-5-deoxy-β-L-xylofuranosyl residue (aceric acid), a 2,4-linked α-D-galactosyl residue, a terminal non-reducing 2-O-methyl α-L-fucosyl residue, a 2,3-linked β-L-arabinopyranosyl residue, a 2-linked α-L-rhamnopyronosyl residue, a terminal non-reducing β-L-arabinofuranosyl residue, and a terminal non-reducing α-L-rhamnopyranosyl residue. The 3-C-carboxy-5-deoxy-β-L-xylofuranosyl (aceric acid) residue is usually, but not always, O-acetylated at position 3. The terminal non-reducing 2-O-methyl α-L-fucosyl residue is usually, but not always, O-acetylated at position 3 or position 4. The glycosyl residues are linked together as illustrated in FIG. 1 at B.

An oligosaccharide (C), attached at the 3-position of a 4-linked galacturosyluronic acid residue, is composed of a terminal non-reducing α-L-rhamnopyranosyl residue and a 3-deoxy-D-manno-octulopyranosylonic acid residue (Kdo). The glycosyl residues are linked together as shown in FIG. 1 at C.

An oligosaccharide (D), attached at the 3-position of a 4-linked galacturosyluronic acid residue is composed of a terminal non-reducing β-L-arabinofuranosyl residue and a 3-deoxy-D-lyxo-heptulopyranosylaric acid residue (Dha). The glycosyl residues are linked together as presented in FIG. 1 at D.

The glycosyl residue compositions and the glycosyl linkage compositions of each of the four oligosaccharide side chains distinguish RG-II from homogalacturonan, which is composed exclusively of 4-linked galactopyranosyluronic acid residues. RG-II is distinguished from rhamnogalacturonan I (RG-I), which contains a backbone composed of the disaccharide repeating unit: [-2)-α-L-rhamnopyranosyl-(1-4)-α-D-galactopyranosyluronic acid]. The 2-linked α-L-rhamnopyranosyl residue is often, but not always, substituted at position 4 with oligosaccharides composed of arabinofuranosyl and galactopyranosyl residues.

The term RG-II, as used herein, encompasses degradation products and derivatives of RG-II having a molecular structure essentially as defined herein, having a molecular weight for a monomeric RG-II of between approximately 3 and 5 kDa and for a dimeric RG-II of between approximately 6 and 10 kDa, wherein the backbone comprises from approximately 7 to approximately 50 galactosyluronic acid residues, wherein an oligosaccharide side chain may be deleted, and wherein an oligosaccharide side chain may comprise a deletion, addition or substitution of a glycosyl residue therein. An RG-II of the invention may be in a purified or partially purified form. A compound may be tested and identified as an RG-II by assaying for the presence of, for example, aceric acid which is an unusual and specific saccharide component found in plants only in RG-II.

The term RG-II monomer or monomeric RG-II or mRG-II, as used herein, refers to a monomeric species of RG-II, having a molecular weight of approximately 4.9 kDa. mRG-II does not interact with boric acid to form a 1:1 borate-diol ester. However, monomeric RG-II, in the presence of boric acid, does form an RG-II dimer crosslinked by a 1:2 borate-diol ester.

The term RG-II dimer or dimeric RG-II or dRG-II, as used herein, refers to a dimeric species of RG-II having a molecular weight of approximately 9.8 kDa. Dimeric RG-II is formed from mRG-II in the presence of a boric acid as a dimer crosslinked by a 1:2 borate-diol ester (dRG-II-B).

The term a cation-rhamnogalacturonan-II complex or a cation-dRG-II-B or a cation-RG-II or a dRG-II-B-metal complex, as used herein, refers to a chemical association or complex formed between a heavy metal cation and a borate ester crosslinked RG-II dimer. The cations bound to dRG-II-B are unlikely to be directly complexed to the borate ester. The complex may be a metal coordination complex with dRG-II-B.

The term multivalent heavy metal cation or heavy metal cation, as used herein, refers to a cation (a) that is capable of forming a complex with an RG-II dimer, (b) that comprises specific chemical and physical properties that include, but are not limited to, having:

a valence of 2+ or 3+, a crystal ionic radius of >0.9 Ångstrom (Å) [Weast, 1986–1987, Handbook of Chemistry and Physics, page F-157, 67th edition, CRC Press, USA], an electronic configuration with an incompletely filled subshell, an ionization energy that is low and associated with a low ionic potential (Z/r, where Z is the charge of the cation and r is the ionic radius);

and (c) that is included in, but is not limited to, a metal (e.g., lead, etc.), an earth metal (e.g., barium, strontium, radium, etc.), a lanthanide (lanthanum, cerium, praseodymium, neodymium, promethium, samarium, europium, gadolinium, etc.) and an actinide (e.g., actinium, thorium, protactinium, neptunium, plutonium, americium, curium, etc.).

The term effective amount, as used herein, refers to the quantity of active ingredient necessary to effect a change in a specific biochemical parameter. For example, an effective amount of rhamnogalacturonan-II, as used herein, is the quantity of rhamnogalacturonan required to complex completely the heavy metal cations responsible for a condition of contamination or toxification or poisoning, such that said condition is ameliorated, neutralized or rendered moot.

The term high amount of RG-II, as used herein, refers to the percentage of plant cell wall that is made up of RG-II, and refers preferentially to plants, and more preferentially to dicots, having an RG-II content of approximately 1–3% or greater of the cell wall.

The term MALDI-TOF MS, as used herein, refers to matrix assisted laser desorption/ionization time of flight mass spectroscopy, a technology well known in the art and detailed in *Instrumental Methods of Analysis*, 5th edition. Willard, Merritt, Dean, eds., D.Van Nostrand Co., New York, 1974.

The term HR-SEC, as used herein, refers to high resolution size exclusion chromatography, a technology well known in the art and described in *Instrumental Methods of Analysis*, 5th edition. Willard, Merritt, Dean, eds., D.Van Nostrand Co., New York, 1974.

The term ICP-AES, as used herein, refers to inductively-coupled-plasma atomic-emission spectroscopy, a technology well known in the art and described in *Instrumental Methods of Analysis*, 5th edition. Willard, Merritt, Dean, eds., D.Van Nostrand Co., New York, 1974.

The present invention provides an RG-II isolated from plant cell walls and from processed fruits and vegetables, e.g., wine. In particular embodiments of the invention, RG-II, was isolated from sycamore and pea stem cell walls and from wine as mixtures of a boron-free monomer (mRG-II) and a boron-containing dimer (dRG-II-B). The dRG-II from red wine was found to have a boron content of approximately 870 ppm.

Figure 2A:
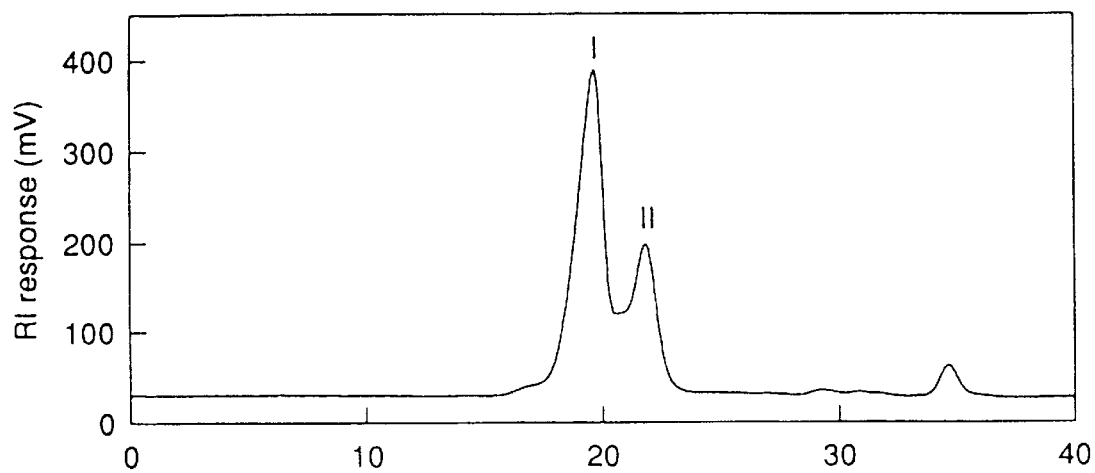
FIG. 2A–D. relate to Superdex-75® HR 10/30 size excusion chromatography of RG-II.
Figure 2B:
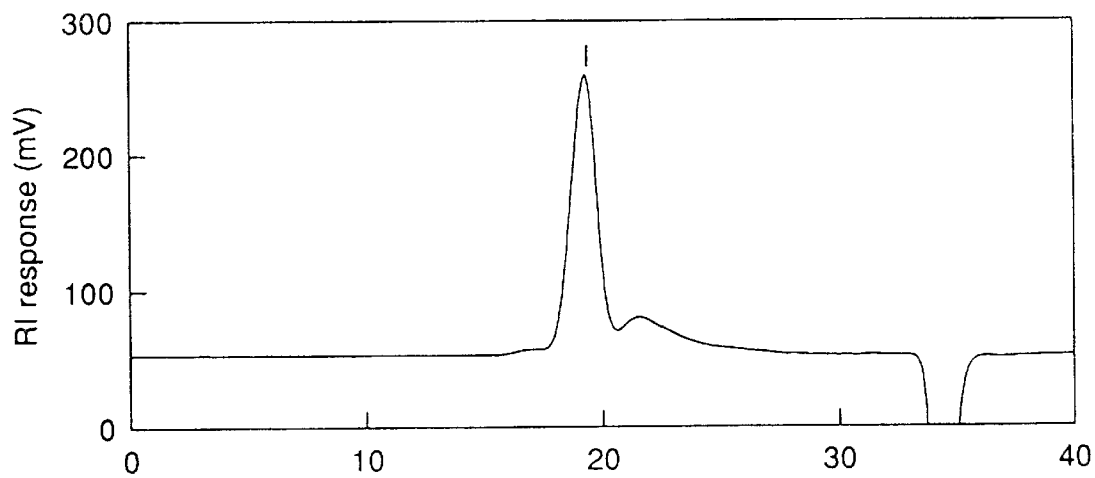
Figure 2C:
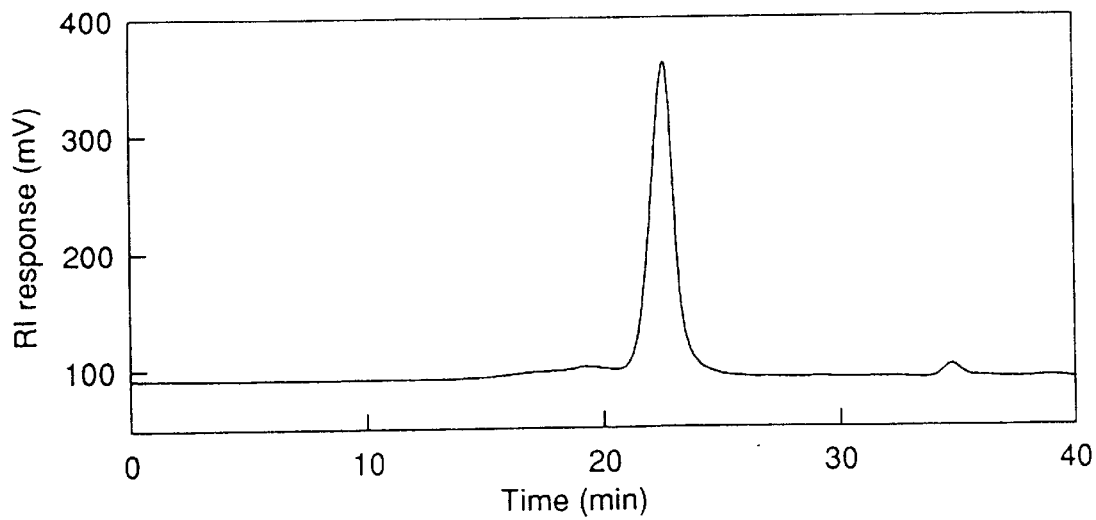

Sycamore, pea, and red wine RG-II were subjected to SEC on a Superdex-75® column (FIGS. 2A–D). Sycamore RG-II was resolved (FIG. 2A) into two components (Fractions I and II), although both components had indistinguishable glycosyl residue compositions (Table 1). MALDI-TOF MS showed that the components in Fractions I and II had molecular masses of 9.811 and 4.941 kDa, respectively. The calculated molecular mass of sycamore RG-II was 4.818 kDa, assuming that its backbone was composed of nine 1,4-linked $\alpha$-D-galactosyluronic acid residues and that the aceric acid-containing side chain (see FIG. 1) contained two O-acetyl groups [Whitcombe et al. (1995) Carbohydr. Res. 271:15–29]. Pea RG-II was resolved into a major peak and a minor peak that had the same retention volumes as Fractions I and II, respectively, of sycamore RG-II (FIG. 2B). The major component had a molecular mass of 10.205 kDa and has a glycosyl residue composition similar to that of sycamore RG-II (Table 1). Red wine RG-II, whose glycosyl residue composition was indistinguishable from sycamore RG-II, had a molecular mass of 4.713 kDa (Table 1) and eluted as a single peak with a retention volume slightly greater than that of Fraction II of sycamore RG-II (FIG. 2C).

Figure 2D:
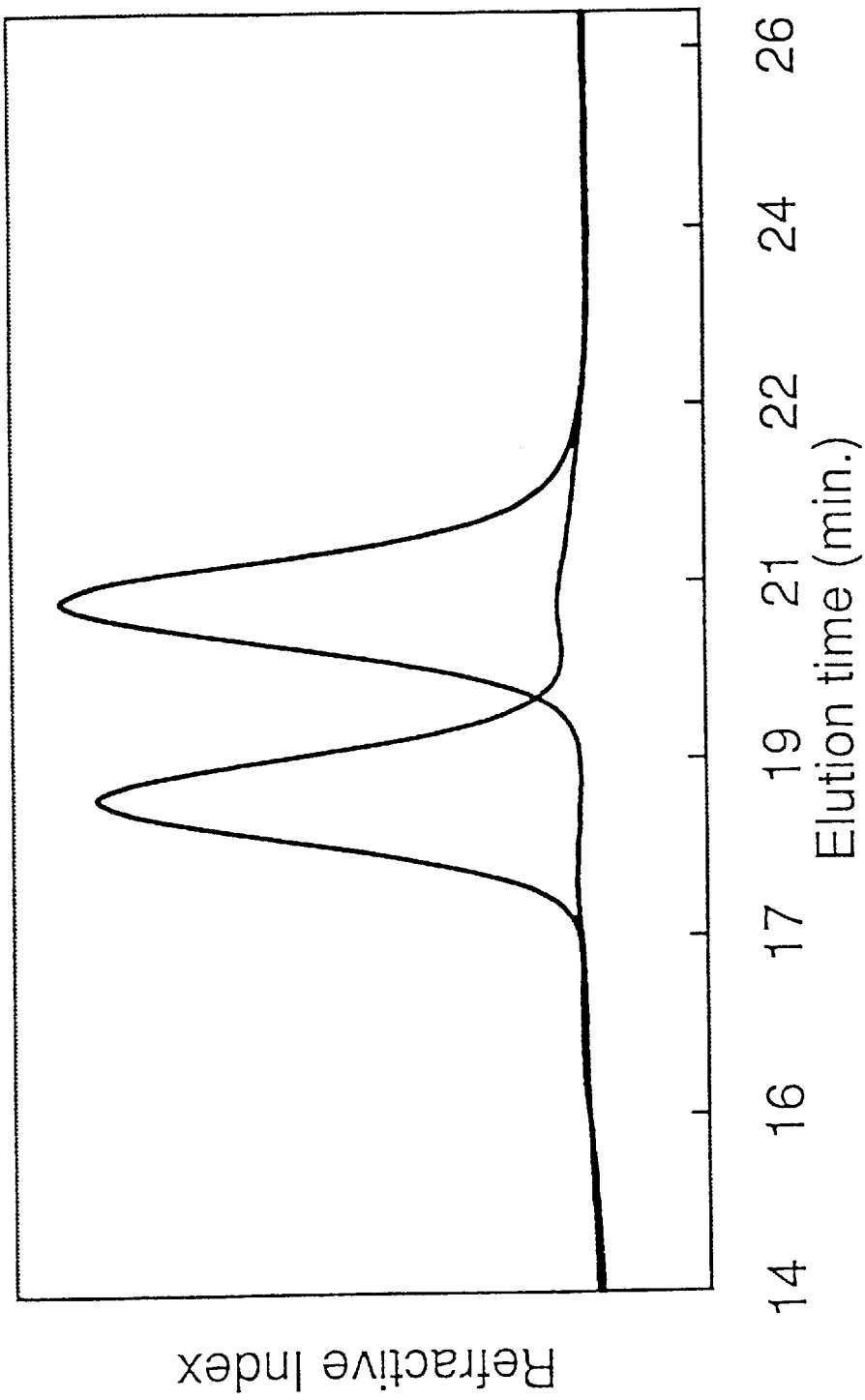

In a large scale preparation of red wine RG-II (see Example 1(c)), the red wine fraction A (dimer) eluted, as shown in FIG. 2D, as a single peak comprising approximately 90% yield of the dimer preparation, while fraction B (monomer) eluted as a peak containing approximately 98% of the monomer preparation.

TABLE 1

Glycosyl residue compositions of sycamore mRG-II and dRG-II-B, etiolated pea stem dRG-II-B, and red wine mRG-II

| Glycosyl residue | Sycamore RG-II | | Pea RG-II | Wine RG-II |
|---|---|---|---|---|
| | dRG-II-B | mRG-II | dRG-II-B | mRG-II |
| Ara | mole % | | | |
| | 13 | 13 | 10 | 11 |
| Rha | 14 | 14 | 11 | 16 |
| Gal | 9 | 7 | 8 | 6 |

TABLE 1-continued

Glycosyl residue compositions of sycamore mRG-II and dRG-II-B, etiolated pea stem dRG-II-B, and red wine mRG-II

| Glycosyl residue | Sycamore RG-II | | Pea RG-II | Wine RG-II |
|---|---|---|---|---|
| | dRG-II-B | mRG-II | dRG-II-B | mRG-II |
| Fuc | 3 | 4 | 2 | 3 |
| Apiose | 4 | 4 | 4 | 6 |
| 2-O-MeXyl | 3 | 4 | 3 | 3 |
| 2-O-MeFuc | 3 | 2 | 3 | 4 |
| GalA | 40 | 42 | 51 | 37 |
| GlcA | 4 | 6 | 3 | 5 |
| Aceric acid | 2 | 1 | 1 | 2 |
| Kdo | 2 | 2 | 3 | 4 |
| Dha | 2 | 2 | 2 | 3 |
| Observed molecular mass (kDa)[a] | 9.811 | 4.941 | 10.205 | 4.713 |
| Calculated molecular mass (kDa)[b] | 9.643 | 4.818 | 10.347 | 4.466 |

[a]Determined by MALDI-TOF MS.
[b]Molecular masses calculated from the structure shown in FIG. 1 and assuming that the backbones of sycamore, pea, and red wine RG-II contain 9, 11, and 7 galactosyluronic acid (GalA) residues, respectively.

The signals corresponding to the molecular ions of sycamore, pea, and red wine RG-II are ~800 a.m.u. wide at 50% peak height. These broad peaks may result in part from the formation of molecular ion salt adducts (e.g., [M+Na]$^+$, [M+2Na]$^+$, etc.) that are often present in the mass spectra of anionic carbohydrates. In addition, the number of galactosyluronic acid residues in the backbone of the various RG-IIs are apparently not identical (see Table 1). RG-II backbones have been shown to contain between eight and eleven 1,4-linked α-D-galactosyluronic acid residues with nine residues being the most abundant [Whitcombe et al. (1995) Carbohydr. Res. 271:15–29].

dRG-II-B from sycamore and pea stem cell walls each contain between 1 and 2 mole of boron per mole of dimer. In contrast, mRG-II from sycamore (Fraction II in FIG. 2A) and red wine contains <0.05 mole of boron per mole of mRG-II. Three additional fractions of RG-II have been isolated from red wine; dimers isolated from two of them have been shown to contain boron. Taken together, these results indicate that two mRG-II molecules are cross-linked by a borate ester to generate dRG-II-B.

Sycamore and Pea dRG-II-B were each shown to contain a borate ester. $^{11}$B NMR spectroscopy is a facile method for characterizing the products formed by the reaction of cis-diols with boric acid or borate [Van Duin et al. (1984) Tetrahedron 40:2901–2911; Makkee et al. (1985) Recl. Trav. Chim. Pays-Bas 104:230–235]. For example, a borate ester with a borate-diol molar ratio of 1:1 (see structure I in FIG. 3A) has an $^{11}$B signal between δ −11.5 and −14.5 ppm (relative to boric acid at δ 0.0 ppm), whereas a borate ester with a borate-diol molar ratio of 1:2 (see structure II in FIG. 3A) has an $^{11}$B signal between δ −8.0 and −10.5 ppm (Van Duin et al., supra; Makkee et al., supra). A 1:1 boric acid-diol ester (see structure III in FIG. 3A) has an $^{11}$B signal between δ 0 and 0.4 ppm that cannot be distinguished from the $^{11}$B signal of boric acid (Van Duin et al., supra). These signals all have line widths between 35 and 120 Hz since the $^{11}$B nucleus is quadrupolar (Van Duin et al., supra; Makkee et al., supra).

Figure 3A:
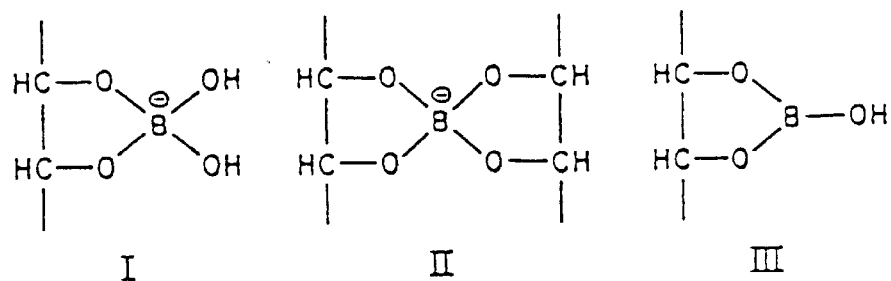
FIGS. 3A–C. relate to the proposed structures of borate esters and the $^{11}$B NMR spectra of dRG-II-B.
Figure 3B:
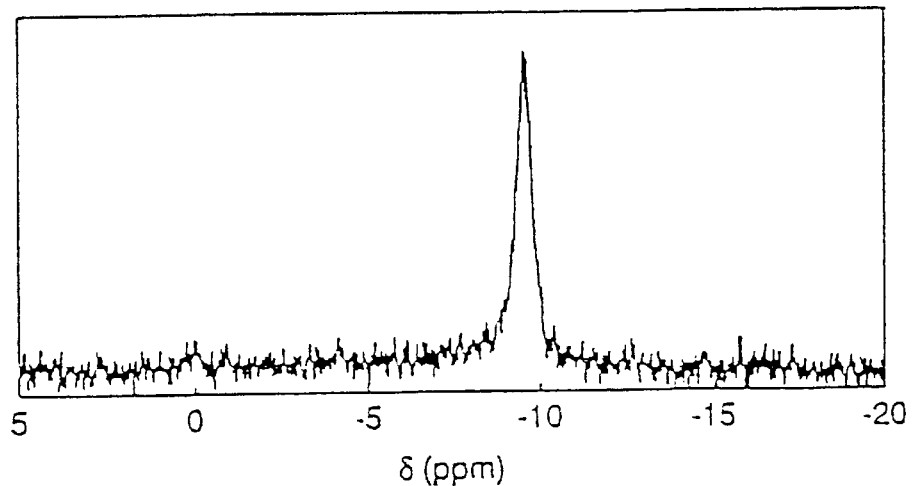
Figure 3C:
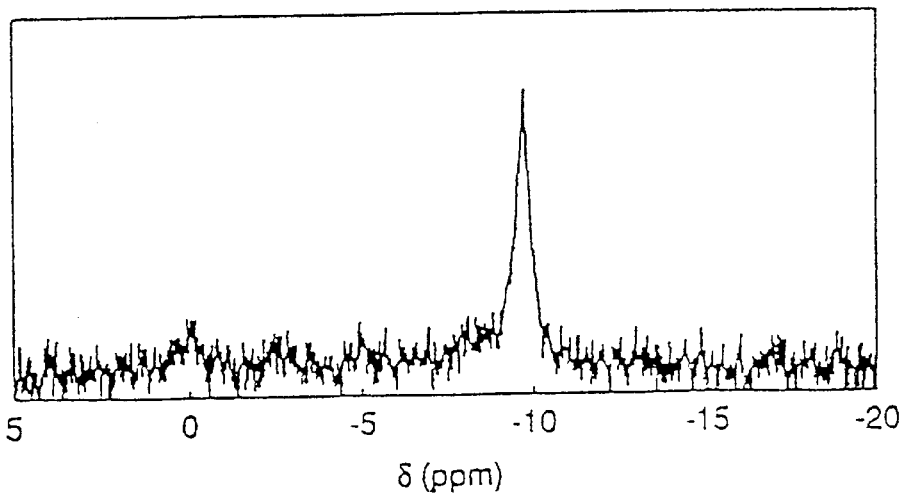

The $^{11}$B NMR spectra of dRG-II-Bs isolated from sycamore and pea cell walls each contain a signal at δ −9.6 ppm (relative to boric acid at δ 0.0 ppm) that is characteristic of a 1:2 borate-diol ester (FIGS. 3B and 3C). No signals were detected in the region (δ −14.4 ppm) corresponding to a 1:1 borate-diol ester. The $^{11}$B NMR spectra of the MRG-II from sycamore and red wine contains no signals corresponding to either the 1:1 or 1:2 borate-diol ester. Thus, dRG-II-B, but not mRG-II, contains a 1:2 borate-diol ester, providing additional evidence that dRG-II-B is cross-linked by a borate ester.

Figure 4A:
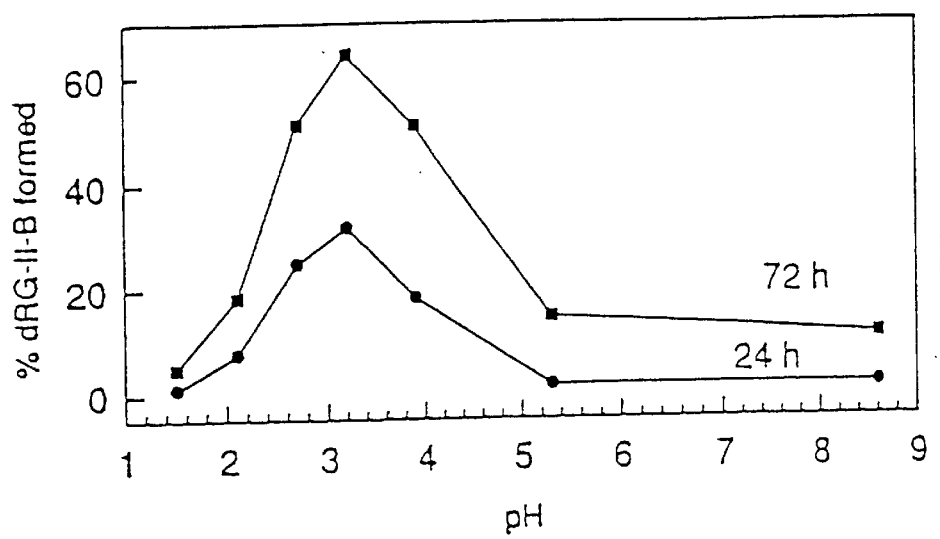
FIGS. 4A–C. relate to the pH dependence for the formation of dRG-II-B from mRG-II.
Figure 4B:
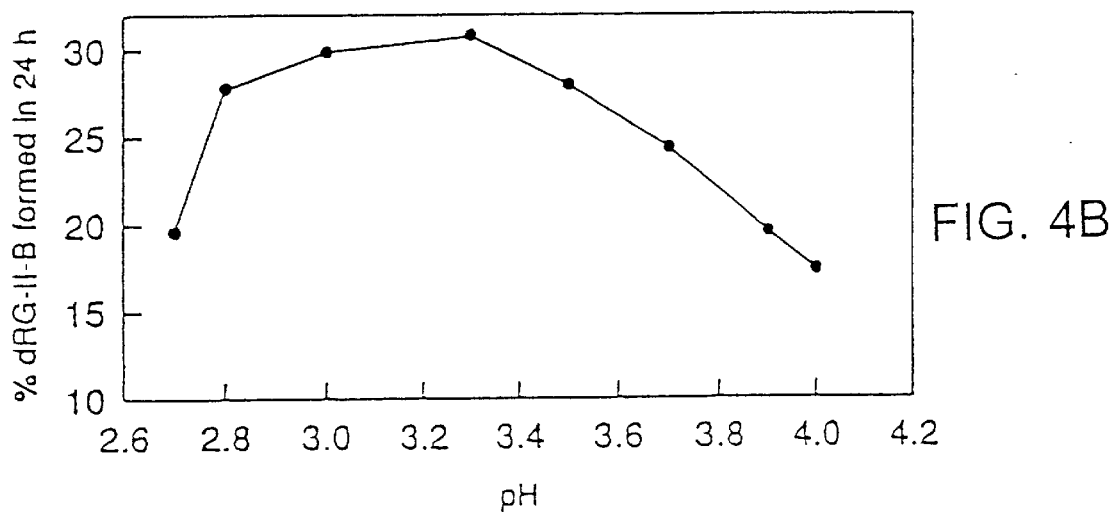

The borate ester in dRG-II-B is stable above pH 4. Treatment of sycamore and pea dRG-II-Bs at 20° C. with 0.1M HCl for 15 min resulted in the formation of mRG-II. Approximately 50% of the dRG-II-B is converted to mRG-II by treatment at pH 1.4 for 30 min at room temperature or by treatment at pH 2.8 for 24 hours at room temperature. dRG-II-B is stable above pH 4 for at least 72 hours at room temperature. No detectable mono- or oligosaccharides are generated by treating dRG-II-B between pH 1 and 3 for 24 hours, providing evidence that mRGII formation does not result from the hydrolysis of a glycosidic bond in dRG-II-B. dRG-II was formed in vitro between pH 2.2 and 4.5 when mRG-II was incubated with boric acid. To provide compelling evidence for borate ester cross-linking of RG-II required the boron-dependent in vitro formation of dRG-II-B. As shown in FIG. 4A, dRG-II-B formed between pH 2.2 and 4.5 in a time-dependent manner when mRG-II was reacted with boric acid. The maximum formation of dRG-II-B occurred between pH 3.0 and 3.4 (FIG. 4B). Such pH values are not unusual for borate ester formation since other anionic diols, including D-xylo-5-hexulosonic acid and glycolic acid, also form 1:2 borate-diol esters between pH 3 and 4 [Van Duin et al., supra; Weast et al. (1983) in CRC Handbook of Chemistry and Physics (Weast, ed.) 64th ed., p. F-170, CRC Press, Boca Raton, Fla.].

Time-resolved $^{11}$B NMR spectroscopic analysis of the products generated by treating red wine mRG-II with boric acid established that a 1:2 borate-diol ester is formed, since the intensity of the signal (δ −9.6 ppm) corresponding to the 1:2 ester increased with time. No signal corresponding to the 1:1 borate-diol ester was detected.

Divalent cations increase the rate of formation of dRG-II-B. dRG-II-B accounts for only ~30% of RG-II when mRG-II is treated for 24 hours at pH 3.1 in the presence of boric acid (see FIGS. 4A and 4B). dRG-II-B released from the walls of suspension-cultured sycamore cells and pea stems contains $Sr^{2+}$ (~0.1 mole of $Sr^{2+}$/mole of dRG-II-B), $Ba^{2+}$(~0.1 mole of $Ba^{2+}$/mole of dRG-II-B), and $Pb^{2+}$(~0.1 mole of $Pb^{2+}$/mole of dRG-II-B). dRG-II-B also contains $Ca^{2+}$, $Na^+$, $K^+$, and $Mg^{2+}$ (1–4 mol/mole dRG-II-B). Sycamore mRG-II contains high levels of $Ca^{2+}$, $Na^+$, $K^+$, and $Mg^{2+}$ but contains no $Pb^{2+}$ and markedly less $Sr^{2+}$ (0.008 mole of $Sr^{2+}$/mole of mRG-II) and $Ba^{2+}$ (0.002 mole of $Ba^{2+}$/mole of mRG-II). Naturally occurring dimeric RG-II of red wine contained approximately 0.25 moles of $Sr^{2+}$, 0.01 moles of $Ba^{2+}$ and 0.02 moles of $Pb^{2+}$ per mole of dRG-II. $Sr^{2+}$, $Pb^{2+}$, and $Ba^{2+}$ could not be detected in naturally occurring red wine mRG-II.

Figure 5A:
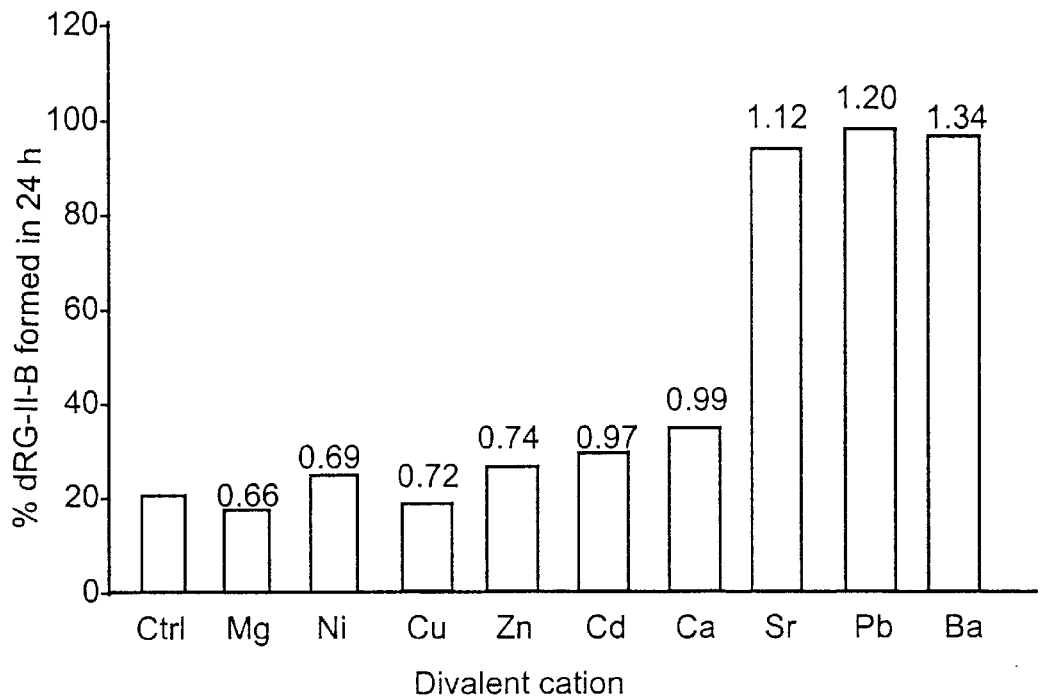
FIGS. 5A and 5B show the effect of selected divalent cations on the amount of dRG-II-B formed from mRG-II in 24 hours at pH 3.7.
Figure 5B:
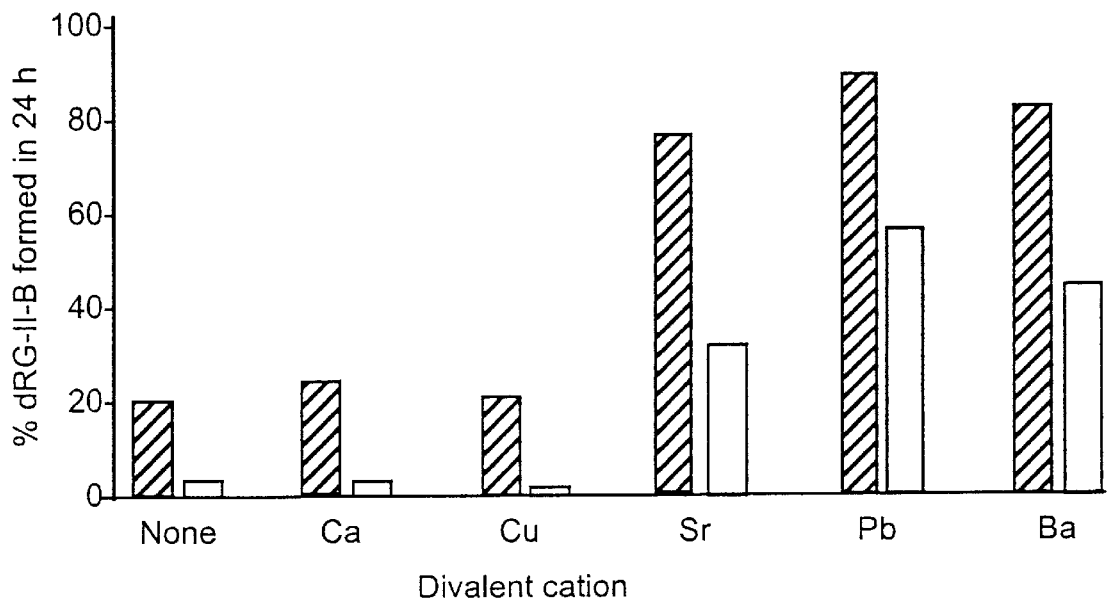

$Sr^{2+}$, $Ba^{2+}$, and $Pb^{2+}$ (0.5 mM) each increased the formation of dRG-II-B at pH 3.7 (FIG. 5A) and pH 5.3 (FIG. 5B), whereas $Ca^{2+}$, $Ni^{2+}$, $Cd^{2+}$, and $Zn^{2+}$ were less effective. In contrast, both $Mg^{2+}$ and $Cu^{2+}$ caused a slight but reproducible decrease in the amount of dRG-II-B formed (FIG. 5A). No dRG-II-B was formed by treating mRG-II with $Sr^{2+}$ and $Ca^{2+}$ in the absence of boric acid, showing that divalent cations do not themselves cause mRG-II to dimerize. Aluminum has no discernible effect on dRG-II-B formation, whereas lanthanum and praseodymium enhance dRG-II-B formation, although they are less effective than lead. The increase in the formation of dRG-II-B in the presence of selected di- and trivalent cations does not result from the higher ionic strength of the reaction mixture since the addition of NaCl (100 mM) has no discernible effect on dRG-II-B formation. The finding that selected di- and trivalent cations enhance dimer formation was unexpected and indicated that steric factors may in part regulate dimer formation, since those di- and trivalent cations that enhance dimer formation all have ionic radii of >1.0 Å (Weast (1983, supra).

Figure 4C:
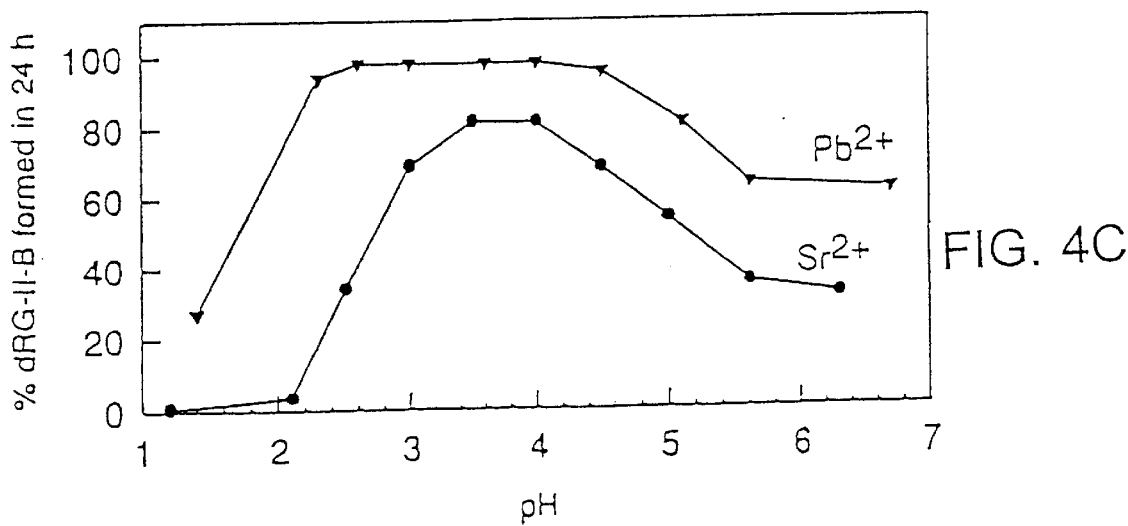

The formation of dRG-II-B in the presence of $Sr^{2+}$ and $Pb^{2+}$ occurred (FIG. 4C) over a wider pH range than in the absence of these cations (FIG. 4A). It may be significant that more dRG-II-B forms between pH 4.8 and 5.5 in the presence of $Sr^{2+}$ and $Pb^{2+}$ than in their absence (compare FIG. 4A and 4C) as this is the physiological pH of the wall [Cosgrove (1993) New Phytol. 124:1–23].

Figure 6:
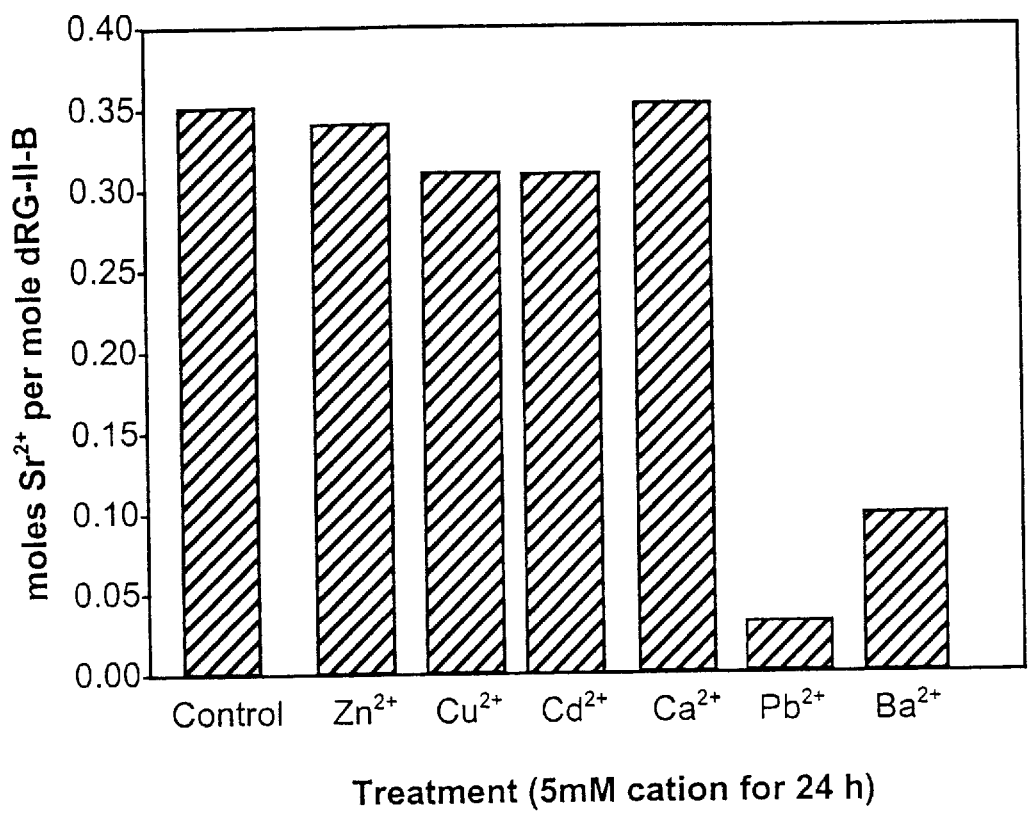
FIG. 6 is a graph showing the displacement of $Sr^{2+}$ from dRG-II-B by divalent cations. Separate solutions of naturally occurring dRG-II-B from a Californian red wine containing approximately 0.35 moles Sr per mole dRG-II-B were incubated with salt solutions of $Zn^{2+}$, $Cu^{2+}$, $Cd^{2+}$, $Ca^{2+}$, $Pb^{2+}$ and $Ba^{2+}$. After extensive dialysis, the residual Sr content in each sample of RG-II was measured. Only $Pb^{2+}$ and $Ba^{2+}$ were effective in displacing $Sr^{2+}$.

Strontium, lead and barium bind to dRG-II-B but not to mRG-II. The ability of selected cations to enhance dRG-II-B formation (FIG. 5A) and the presence of $Sr^{2+}$, $Pb^{2+}$, and $Ba^{2+}$ in naturally occurring dRG-II-B arises from the cation-binding properties of mRG-II and dRG-II-B. dRG-II-B generated from mRG-II and boric acid in the presence of $Sr^{2+}$, $Pb^{2+}$, or $Ba^{2+}$ contained ~1 mole of divalent cation per mole of dimer (Table 2). These cations form metal coordination complexes with dRG-II-B since they are not removed by treatment with Chelex® resin. mRG-II did not bind $Sr^{2+}$ or $Ba^{2+}$ and bound ~10-fold less $Pb^{2+}$ than was bound by the dimer (Table 2). The dRG-II-B formed from mRG-II and boric acid in the presence of $La^{3+}$ and $Pr^{3+}$ contained ~2 mole of these trivalent cations/mole of dimer.

dRG-II-B has a high affinity for selected heavy metal cations. As shown in FIG. 6, heavy metal cations that are complexed to RG-II can be displaced only by specific heavy metal cations. For example, $Sr^{2+}$ that is bound in a naturally occurring cation-RG-II complex in red wine was incubated at pH 5 with various multivalent salts. Of these, only $Pb^{2+}$ and $Ba^{2+}$ were capable of displacing the $Sr^{2+}$ from the cation-RG-II complex. $Zn^{2+}$, $Cu^{2+}$, $Cd^{2+}$ and $Ca^{2+}$ were not effective.

This property of RG-II in exhibiting a particular selectivity and affinity for specific heavy metal cations (e.g., $Sr^{2+}$, $Pb^{2+}$, $Ba^{2+}$, etc.) endows RG-II with a particular advantage over other chelators of heavy metal cations which either have a greater affinity for divalent cations such as $Mg^{2+}$, $Ca^{2+}$, etc., or which show generally low affinities for many cations. For example, in human or other applications, RG-II can be used to complex and remove toxic heavy metal cations without the fear of also removing essential cations, for example, $Ca^{2+}$, etc. from body fluids or tissues.

Dimeric dRG-II-B is capable of complexing high levels of $Cd^{2+}$, $Pb^{2+}$, $Sr^{2+}$, $Zn^{2+}$ and Cu. dRG-II-B isolated from a Californian red wine was incubated at pH 5 in the presence of various heavy metal cations and, after extensive dialysis, was analyzed for metal content. As presented in Table 3, dRG-II-B took up high levels of $Ca^{2+}$, $Cd^{2+}$, $Pb^{2+}$, $Sr^{2+}$, $Zn^{2+}$ and $Cu^{2+}$, approximately 8.2, 5.8, 6.5, 5.5, 5.0 and 4.6 moles/mole dRGII-B, respectively. The $Ca^{2+}$ associated with the dRG-II-B complex was easily displaced, as shown in Table 3, when the complex was incubated with any of the heavy metal cations tested. Thus, the association of $Ca^{2+}$ with the dimeric RG-II does not appear to exemplify the same high affinity cation-dRG-II-B complex that is formed with, for example, $Pb^{2+}$, etc.

TABLE 2

The concentrations of heavy metals bound to mRG-II and dRG-II-B formed from mRG-II in the presence of $Sr^{2+}$, $Pb^{2+}$, and $Ba^{2+}$ (All the solutions were dialyzed for 16 hours against deionized water. Each solution was eluted through a column (1 × 2 cm) containing Chelex ® 100 cation exchange resin ($Na^+$ form). The eluants were then freeze-dried prior to ICP-AES analysis.

| mRG-II at pH 4, added reactants | dRG-II-B formed[a] | Element (mole/mole mRG-II or dRG-II-B) | | | |
|---|---|---|---|---|---|
| | | $Sr^{2+}$ | $Pb^{2+}$ | $Ba^{2+}$ | Boron |
| None(b) | | % RG-II | | | |
| | 0.0 | 0.0 | tr[c] | tr | 0.0 |
| +$Sr^{2+}$ [d] | 0.0 | tr | 0.0 | 0.0 | 0.0 |
| +$Sr^{2+}$ and boric acid[e] | 95.0 | 1.0 | 0.0 | 0.0 | 1.6 |
| +$Pb^{2+}$ [d] | 0.0 | 0.0 | 0.1 | 0.0 | 0.0 |
| +$Pb^{2+}$ and boric acid[e] | 95.0 | tr | 1.4 | 0.0 | 1.6 |
| +$Ba^{2+}$ [d] | 0.0 | tr | tr | tr | 0.0 |
| +$Ba^{2+}$ and boric acid[e] | 95.0 | 0.0 | tr | 0.8 | 1.3 |

[a]The percent of dRG-II-B formed after 24 hours was determined by SEC.
[b]mRG-II (0.9 mM) phthalate/HCl, pH 4 (0.5 ml), was kept at room temperature for 24 hours.
[c]tr, contains less than 0.05 mole of divalent cation per mole of RG-II.
[d]mRG-II (0.9 mM) in 50 mM phthalate/HCl, pH 4 (0.4 ml), containing the divalent cation (2 mM) was kept at room temperature for 24 hours.
[e]mRG-II ( ).9 mM) in 50 mM phthalate/HCl, pH 4 (0.5 ml), containing the divalent cation (2 mM) and boric acid (2 mM) was kept at room temperature for 24 hours.

The $^{11}B$ NMR signals corresponding to the 1:2 borate-diol ester of dRG-II-B formed in the presence of $Pb^{2+}$, $La^{3+}$, and $Pr^{3+}$ have similar chemical shifts (δ −8.8 to −9.7) and line widths (75–120 Hz). $La^{3+}$ and $Pr^{3+}$ are cations that affect the chemical shift and cause line broadening of nuclei with which they interact [Peters et al. (1983) Recl. Trav. Chim. Pays-Bas 102:391–392]. Thus, the cations bound to dRG-II-B are unlikely to be directly complexed to the borate ester.

TABLE 3

| | | Cation used to treat dRG-II-B | | | | | | |
|---|---|---|---|---|---|---|---|---|
| Element[2] | K204A[1] | Pb | Sr | Ba | Ca | Cd | Zn | Cu |
| | | moles of element/mole of dRG-II-B | | | | | | |
| Al | 0.02 | 0 | 0 | 0 | 0 | 0 | 1 | 0 |
| B | 1.50 | 1.10 | 1.28 | 1.25 | 1.43 | 1.25 | 1.32 | 1.17 |
| Ba | 0 | 0 | 0 | 5.0 | 0 | 0 | 0 | 0 |
| Ca | 4.20 | 0.54 | 2.33 | 2.50 | 8.20 | 1.90 | 3.05 | 2.62 |
| Cd | 0 | 0 | 0 | 0 | 0 | 5.80 | 0 | 0 |
| Co | 0 | 0 | 0 | 0 | 0 | 0.02 | 0 | 0 |
| Cr | 0 | 0 | 0 | 0 | 0 | 0 | 0 | 0 |
| Cu | 0 | 0 | 0 | 0 | 0 | 0 | 0 | 4.57 |
| Fe | 0 | 0 | 0 | 0 | 0 | 0 | 0 | 0 |
| K | 0.20 | 0.16 | 0 | 0.15 | 0.09 | 0.04 | 0.22 | 0.03 |
| Mg | 0.06 | 0.01 | 0.01 | 0 | 0.02 | 0.02 | 0.02 | 0.01 |
| Mn | 0 | 0 | 0 | 0 | 0 | 0 | 0 | 0 |
| Mo | 0 | 0 | 0 | 0 | 0 | 0 | 0 | 0 |
| Na | 0.37 | 0.66 | 0.26 | 0.26 | 0.57 | 0.21 | 0.30 | 0.21 |
| Ni | 0 | 0 | 0 | 0 | 0 | 0 | 0 | 0 |
| P | 0 | 0 | 0 | 0 | 0 | 0 | 0 | 0 |
| Pb | 0 | 6.50 | 0 | 0 | 0 | 0 | 0 | 0 |
| Si | 0 | 0 | 0 | 0 | 0 | 0 | 0 | 0 |
| Sr | 0.35 | 0.03 | 5.45 | 0.10 | 0.35 | 0.31 | 0.34 | 0.31 |
| Zn | 0 | 0.01 | 0.09 | 0.01 | 0.02 | 0.01 | 5.04 | 0.02 |

[1]K204A is dRG-II-B isolated from Californian red wine.
[2]Elements determined by ICP-AES.

The borate ester in dRG-II-B appears to be attached to only two of the four 1→3'-linked apiosyl residues. The only significant difference in the glycosyl-linkage compositions of mRG-II and dRG-II-B formed in vitro is in the apiosyl residues (Table 4). The apiosyl residues are all 1→3'-linked in mRG-II but are a mixture of 1→3'- and 1→2,3,3'-linked apiosyl residues in dRG-II-B. This indicates that the borate ester is linked to C-2 and C-3 of at least one of the apiosyl residues. The borate ester of naturally occurring red wine dRG-II-B also appears to be located on the apiosyl residues. Apiose, which has been reported to form a borate ester at pH 5 [Loomis et al. (1992) BioFactors 3:229–239], is the only furanosyl residue in RG-II with free vicinal cis-diols. Glycofuranoses are known to form the most stable borate esters [Van den Berg et al. (1994) Carbohydr. Res. 253:1–12].

TABLE 4

Glycosyl linkage compositions of red wine mRG-II and the dRG-II-B formed in vitro from red wine mRG-II

| Glycosyl linkage | mRG-II[a] mole %[c] | dRG-II-B[b] mole %[c] |
|---|---|---|
| T-Araf[d] | 5 | 6 |
| 1→2-Arap | 1 | 1 |
| 1→2, 3-Araf | 3 | 3 |
| T-Rhap | 6 | 6 |
| 1→2-Rhap | 4 | 3 |
| 1→3-Rhap | 4 | 4 |
| 1→2, 3, 4-Rhap | 5 | 5 |
| T-Galp | 4 | 5 |
| 1→3, 4-Galp | 2 | 2 |
| 1→3, 6-Galp | 5 | 4 |
| 1→3, 4-(2-O-Me)-Fucp | 4 | 4 |
| 1→3, 4-Fucp | 3 | 3 |
| 1→3'-Apif | 8 | 6 |
| 1→2, 3, 3'-Apif[e] | 0 | 3 |
| T-(2-O—Me)-Xylp | 3 | 3 |
| T-GalpA | 12 | 12 |
| 1→4-GalpA | 10 | 9 |
| 1→3, 4-GalpA | 6 | 6 |
| 1→2, 4-GalpA | 5 | 6 |
| 1→2, 3, 4-GalpA | 3 | 5 |
| 1→2-GlcpA | 5 | 4 |

[a]mRG-II is red wine monomeric RG-II as described in FIG. 2C.
[b]The dRG-II-B formed when red wine mRG-II (0.5 mM) is treated for 24 hours with boric acid (1.2 mM) at pH 3.2.
[c]Data do not include values for 5-linked Kdo and 5-linked Dha.
[d]T-Araf = a nonreducing terminal arabinofuranosyl residue etc.
[e]The derivative of the 1→2, 3, 3'-linked apiosyl residues (1, 2, 3 , 3', 5-penta-O-acetylapiitol)co-chromatographed with authentic 1, 2, 3, 3', 5-penta-O-acetylapiitol.

RG-II binds specific cations during the process of dimer formation. A solution of red wine mRG-II (e.g., fraction II of FIG. 2C) was incubated with either $BaCl_2$, $SrCl_2$ or $Pb(NO_3)_2$ in the absence or presence of boric acid under conditions permitting more than 95% of the total RG-II to be in the dimeric form. ICP-AES analysis indicated that the dimers formed in the presence of the activator cations Ba, Sr and Pb contained approximately 1 mole of bound cation per mole of polysaccharide.

RG-II dimers are also capable of binding specific cations. Dimeric wine RG-II possessing "free" sites of complexation was able to bind specific cations, e.g., Pb, Br, Sr. Thus, these specific cations can be complexed by RG-II that is already in the dimeric form.

The specific cations that are capable of binding to dimeric RG-II are characterized by the ability to induce dimer formation in vitro. The rate and yield of dimer formation is therefore an easy way to assess the ability of cations to form complexes with RG-II dimers. mRG-II from red wine (fraction II of FIG. 2C) was incubated with boric acid and either $AlCl_3$, $BaCl_2$, $CaCl_2$, $Ce(NO_3)_3$, $Ce(SO_4)_2$, $CuCl_2$, $Eu(NO_3)_3$, $Hg(NO_3)_2$, $HgCl_2$, $LaCl_3$, $MgCl_2$, NaCl, $NiCl_2$, $Pb(NO_3)_2$, $PrCl_3$, $SbCl_3$, $SnCl_2$, $SrCl_2$, or $Zn(NO_3)_2$ to determine which of these cations were capable of enhancing the formation of dimeric RG-II. As presented in Table 4, $Ba^{2+}$, $Ce^{3+}$, $Eu^{3+}$, $La^{3+}$, $Pb^{2+}$, $Pr^{3+}$ and $Sr^{2+}$ functioned as efficient activators of the dimerization process. The other elements that were tested had no significant effect when compared to the control.

Comparative analyses of the properties of those cations which were incapable and those which were capable of specific binding with RG-II and of enhancing RG-II dimerization suggested particular characteristics (see Table 5) that were required for a cation to form complexes with RG-II dimers. These particular characteristics include, but are not limited to:

a valence of 2+ or 3+;

a crystal ionic radius that is >0.9 Ångström (Weast (1986–1987) *Handbook of Chemistry and Physics*, page F-157, 67th edition, CRC Press, USA)

s, p, d, f orbitals having insaturations in their internal layers; and an ionization energy that is low and associated to a low ionic potential (Z/r where Z is the charge of the cation and r is the ionic radius).

TABLE 5

Properties of the Cations and their effects on the dimerization of RG-II

| Element | Valence | Crystal Ionic Radius (A) | Ionic Ionization Energy (volts) | | | | Potential z/r (A-1) | Active on % dimer formed* | dimer formation |
|---|---|---|---|---|---|---|---|---|---|
| | | | I | II | III | IV | | | |
| Control | | | | | | | | 25 | |
| Al | 3+ | 0.55 | 5.984 | 18.823 | 28.44 | — | 5.45 | 20 | − |
| Ba | 2+ | 1.34 | 5.21 | 10.00 | — | — | 1.49 | 100 | + |
| Ca | 2+ | 0.99 | 6.111 | 11.868 | — | — | 2.02 | 35 | − |
| Cd | 2+ | 0.97 | 8.991 | 16.949 | — | — | 2.06 | 30 | − |
| Ce | 3+ | 1.03 | 5.6 | 12.3 | 20 | — | 2.90 | 94 | + |
| Ce | 4+ | 0.92 | 5.6 | 12.3 | 20 | 33.3 | 4.35 | 22 | − |
| Cu | 2+ | 0.72 | 7.720 | 20.29 | — | — | 2.78 | 20 | − |
| Eu | 3+ | 0.95 | 5.67 | 11.24 | | | 3.16 | 85 | + |
| Hg | 2+ | 1.10 | 10.93 | 18.751 | — | — | 1.82 | 25 | − |
| K | 1+ | 1.33 | 4.339 | — | — | — | 0.75 | 25 | − |
| La | 3+ | 1.06 | 5.61 | 11.93 | 19.17 | — | 2.83 | 100 | + |

TABLE 5-continued

Properties of the Cations and their effects on the dimerization of RG-II

| Element | Valence | Crystal Ionic Radius (A) | Ionic Ionization Energy (volts) | | | | Potential z/r (A-1) | Active on % dimer formed* | dimer formation |
|---|---|---|---|---|---|---|---|---|---|
| Mg | 2+ | 0.66 | 7.669 | 15.031 | 80.14 | — | 3.03 | 20 | – |
| Na | 1+ | 0.97 | 5.138 | — | — | — | 1.03 | 25 | – |
| Ni | 2+ | 0.69 | 7.633 | 18.15 | — | — | 2.90 | 25 | – |
| Pb | 2+ | 1.20 | 7.415 | 15.028 | — | — | 1.67 | 100 | + |
| Pr | 3+ | 1.01 | 5.96 | | | | 2.96 | 100 | + |
| Sb | 3+ | 0.76 | 8.639 | 16.5 | 25.3 | — | 3.95 | 20 | – |
| Sn | 2+ | 0.93 | 7.342 | 14.628 | — | — | 2.15 | 15 | – |
| Sr | 2+ | 1.12 | 5.692 | 11.027 | — | — | 1.79 | 100 | + |
| Zn | 2+ | 0.74 | 9.391 | 17.96 | — | — | 2.70 | 30 | – |

*Dimer formed after 24 h of incubation of 0.5 mM RG-II monomer, at pH 3.4, in the presence of 1.2 mM boric acid and 0.5 mM of the element tested.

I, II, III, IV corresponds to $M \xrightarrow{I} M^+ \xrightarrow{II} M^{2+} \xrightarrow{III} M^{3+} \xrightarrow{IV} M^{4+}$ The formation of complexes between cations and RG-II dimers is specific for cations having the above-described, particular characteristics. Elements capable of forming cations having these particular characteristics include, but are not limited to, metals, e.g., lead;

earth metals, e.g., barium, strontium, radium;

lanthanides, e.g., lanthanum, cerium, praseodymium, neodymium, promethium, samarium, europium, gadolinium; and actinides, e.g., actinium, thorium, protactinium, neptunium, plutonium, americium, curium. dRG-II-B complexes of the invention find utility as:

a cation carrier, where the cation is a specific heavy metal cation capable of complexation with RG-II;

a non-toxic complex for the delivery of selected heavy metal cations to target cells and tissues;

a heavy metal complex, e.g., La-dRG-II, as a water soluble chemical shift reagent for NMR spectroscopy;

a non-toxic complex for boron neutron capture therapy; and an ionophoric antibiotic wherein the cation-dRG-II complex is toxic to microorganisms by virtue of the toxicity of the specific heavy metal cation.

RG-II forms complexes with toxic cations in beverages. These complexes can be effectively removed directly from the liquids by adsorption or exchange chromatography or by filtration methods as detailed in Example 3(b). Six varieties of Vitis vinifera, i.e., Carignan Noir, Merlot, Grenache noir, Muscat d'Alexandrie, Chardonnay and Sauvignon, were analyzed for lead content. As shown in Table 6, all of the wine varieties tested contained lead. After chromatography through polystyrene-divinylbenzene resin, the wine unretained by the resin contained less than 10% of the initial lead content. Wine components retained by the resin were found to be RG-II and lead. RG-II was quantitatively adsorbed on the resin and more than 90% of the initial lead content was eliminated from the wine by the resin. Thus, removal of the lead contamination parallels the quantitative removal of the RG-II component from wine, indicating that in wine lead is associated with RG-II.

TABLE 6

Lead content (μg/L) of wines from six grape varieties of Vitis vinifera and % lead eliminated by adsorption chromatography on a polystyrene-divinyl benzene resin

| | Red wines | | | White wines | | |
|---|---|---|---|---|---|---|
| | Carignan | Merlot | Grenache | Muscat | Chardonnay | Sauvignon |
| Lead content | 73 | 87 | 38 | 56 | 39 | 41 |
| Residual lead content | 4 | 3 | 3 | 5 | 4 | 4 |
| % of lead removed | 94 | 97 | 93 | 91 | 90 | 89 |

Cation-RG-II complexes can be removed from liquids contaminated with heavy metal cations not only by adsorption chromatography on, for example, polystyrene-divinylbenzene resin and the like, but (as indicated in Example 3) also by adsorption on activated charcoal, or by filtration, for example, through ultrafiltration membranes and the like, or by anion-exchange chromatography, for example, on Dowex or other such anion exchangers, or by other means known in the art.

In liquids that are contaminated with specific heavy metal cations, the cation contaminant can be removed from the contaminated liquid by the addition of RG-II to the liquid in order to sequester the specific cations through complexation to the added RG-II. As described in Example 3(b)(ii), a lead-containing solution was treated with RG-II, in monomeric form, which in the presence of boric acid led to the formation of a dRG-II-lead complex, which was then easily and in routine fashion separated from the decontaminated wine. Treatment with monomeric RG-II and boric acid resulted in either a total removal of the contaminating heavy metal cation or a decrease to between 0% and approximately 11% of the initial cation level (see Table 7), depending on the means used for separation of the cation-RG-II complex formed.

Dimeric RG-II can also be used to decontaminate a liquid containing specific heavy metal cations. As exemplified in Example 3(b)(iii), lead can be removed from a lead-containing solution by the addition of dimeric RG-II followed by removal of the dRG-II-lead complex formed. Treatment with dimeric RG-II decreased the lead content of the contaminated solution to between approximately 5 and 29% (Table 7). Removal of a heavy metal cation from a contaminated solution appeared to be more complete with monomeric RG-II in the presence of boric acid than with dimeric RG-II.

TABLE 7

Residual lead content (relative %) after removal of the dRG-II-lead complex from lead-containing solutions by ultrafiltration, adsorption or anion-exchange chromatography

|  | Red wine | A | B | C |
| --- | --- | --- | --- | --- |
| Lead content (μg/L) | 73 | 2700 | 1150 | 1300 |
| Ultrafiltration | 0 | 9 | 5 | 74 |
| Adsorption on polystyrene-divinyl benzene resin | 3 | 0 | 27 | 65 |
| Adsorption on activated charcoal | 0 | 11 | 29 | 50 |
| Anion-exchange on Dowex 1X2-400 resin | 40 | 0 | 19 | 60 |

A: mRG-II (2.5 g/L, final concentration) and boric acid (1.2 mM, final concentration) were added to 0.4 mM $Pb(NO_3)_2$ solution in 50 mM potassium hydrogen phthalate/HCl, pH 3.5.
B: dRG-II (100 mg/L, final concentration) was added to a 6.6 μM $Pb(NO_3)_2$ solution in 50 mM potassium hydrogen phthalate/HCl, pH 3.5.
C: A 6.6 μM $Pb(NO_3)_2$ solution in 50 mM potassium hydrogen phthalate/HCl, pH 3.5, in the absense o fmRG-II or dRG-II.

As shown in Table 7, for all procedures used to remove the complex from the solution, the elimination of lead from the solution was directly proportional to the removal of dRG-II, ultrafiltration being the more efficient means of complex removal. In control experiments, these procedures for removal of complexes from solution were applied to the 6.6 μM $Pb(NO_3)_2$ solution in 50 mM potassium hydrogen phthalate/HCl pH 3.5 in absence of mRG-II or dRG-II (Solution C) and under these control conditions less than 50% of the lead was removed (Table 6).

Dicots and non-graminaceous monocots have a higher requirement for boron than the Gramineae [Loomis et al. (1992) nBioFactors 3:229–239; Shelp et al. (1995) Physiol. Plant. 94:356–361; Welch (1995) Crit. Rev. Plant Sci. 14:49–82]. The boron requirement of a plant appears to be correlated with the RG-II content of the cell wall since the walls of the Gramineae contain approximately 3-fold less RG-II than the walls of dicots and non-graminaceous monocots [Hu et al. (1996) J. Exp. Bot. 47:227–232]. One gram of dicot cell walls containing 5% RG-II can covalently bind ~6 μmole of boron; rice cell walls, which contain ~0.3% RG-II [O'Neill et al. (1991) in *Methods of Plant Biochemistry* (Dey, ed.) Vol. 2, pp. 415–441, Academic Press, London], could covalently bind only ~0.5 μmole of boron (assuming that all the boron is linked to RG-II and that 1 mole of dRG-II contains at least 1 mole of boron). These values are in broad agreement with the boron requirements of dicots and non-graminaceous monocots (2–5 μmole of boron/g dry weight of tissue) and Gramineae (0.4–1 μmole of boron/g dry weight of tissue) [Hu et al (1996) supra]. Thus, it appears that the boron requirement of plants is determined to a large extent by the RG-II content of its cell wall.

It is generally accepted that most of the boron in plant tissues is present in a nonavailable form [Shelp et al. (1995) supra; Brown et al. (1994) Physiol. Plant 91:435–441]. In above pH 4.0, to mRG-II and boric acid, a result that is consistent with the fact that wall-bound boron is not solubilized by treating walls with water, alkali, or high concentrations of borate but is solubilized by acid [Loomis et al. (1992) supra; Brown et al. (1994) supra].

Figure 7:
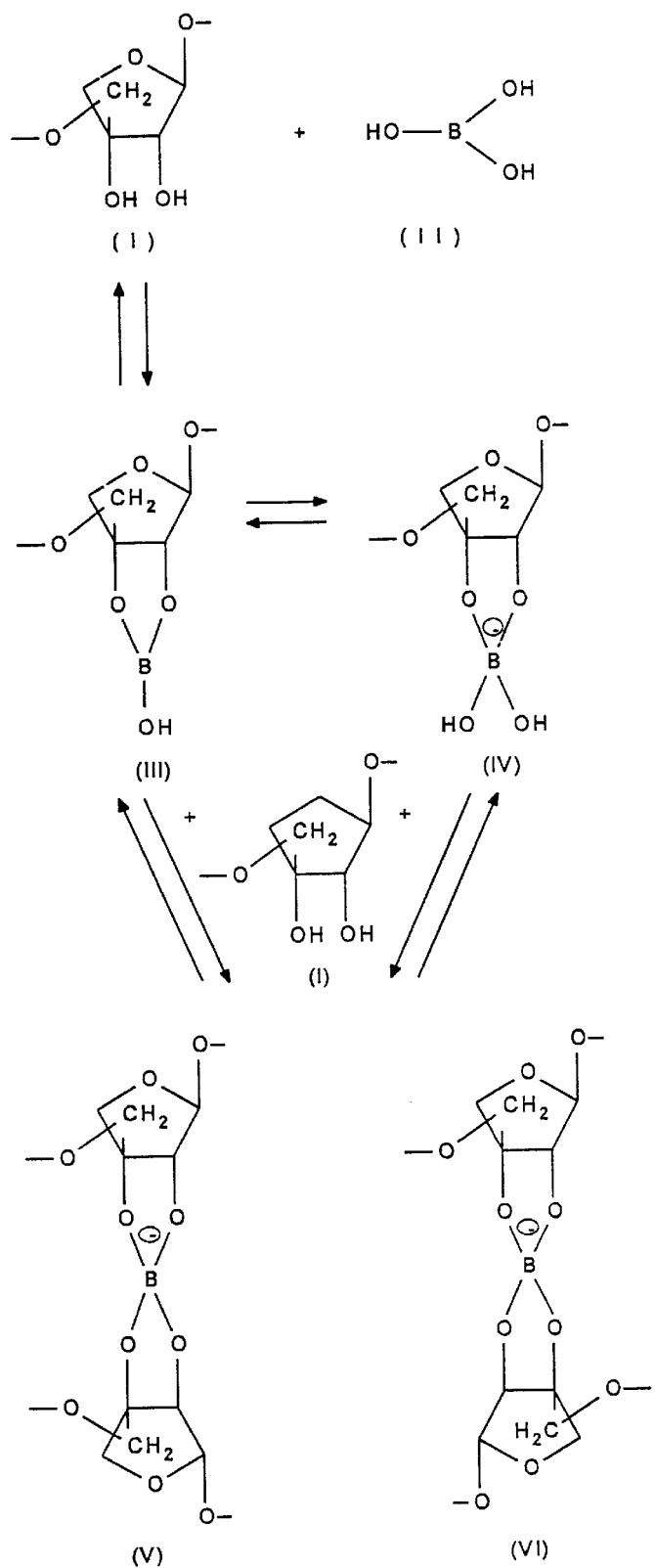
FIG. 7 is a scheme of proposed reaction of two 1,3' linked β-Dapiosyl residues (I) with boric acid (II). The 1:1 boric acid ester (III) and the 1:1 borate ester (IV) of an apiosyl residue can each react with a second 1→3'-linked β-D-apiosyl residue to generate one of the two diastereomeric forms of bis(β-D-apiofuranosyl)-(R)-2,3:2,3 and -(S)-2,3:2,3 borate (V and VI).

Borate-diol ester formation is believed to involve the formation of transient intermediates [Van Duin et al. (1984) Tetrahedron 40:2901–2911]. The in vitro formation of the RG-II dimer probably involves the formation of a 1:1 boric acidor 1:1 borate-mRG-II intermediate as shown in FIG. 7. These intermediates, if they form, appear to be rapidly converted to dRG-II-B since no evidence for 1:1 borate-diol ester formation was obtained by time-resolved $^{11}B$ NMR spectroscopic analysis of the dRG-II-B formed during the reaction of mRG-II and boric acid.

The role of metallic cations in dRG-II-B formation in vitro appears to be catalytic. The fact that the dimer is formed much more slowly in their absence (FIG. 4A and FIG. 5A and 5B) is consistent with a mechanism wherein metallic cations "catalyze" dimer formation. only divalent cations with an ionic radius >1.1 Å ($Sr^{2+}$, $Pb^{2+}$, and $Ba^{2+}$) significantly increase the rate of dRG-II-B formation (see FIG. 5A and 5B). Thus, the effective cations do not function by nonspecific charge suppression. The large cations may bind to mRG-II by reversible electrostatic interactions and induce a conformational change that promotes the formation of a borate ester cross-link and a dRG-II-B-metal coordination complex.

The mechanisms that allow some plants to grow in the presence of heavy metals, including $Sr^{2+}$, $Pb^{2+}$, and $Ba^{2+}$, may contribute to reducing the levels of these toxic cations in soil and water [Salt et al. (1995) Biotechnology 13:468–474; Drake and Rayson (1996) Anal. Chem. 69:22A–27A; Jackson et al. (1990) J. Environ. Qual. 19:644–648]. The binding sites of $Sr^{2+}$, $Pb^{2+}$, and $Ba^{2+}$ appear to comprise anionic glycosyl residues in the plant cell wall. It is disclosed that in vitro dRG-II-B binds at least 10-time more $Sr^{2+}$. $Pb^{2+}$, and $Ba^{2+}$ (Table 2) than is present in naturally occurring sycamore and pea dRG-II-B and that these cations appear to form coordination complexes with dRG-II-B. Thus, the cation-binding capacity of dRG-II-B exceeds the levels of these large cations found in primary cell walls and may be a mechanism that allows plants to grow in the presence of toxic levels of $Sr^{2+}$, $Pb^{2+}$, or $Ba^{2+}$.

The methods for complexation and sequestration of specific heavy metal cations with monomeric and/or dimeric RG-II can be applied to the decontamination and/or detoxification of specific heavy metal cation-contaminated foods used for human and animal consumption. Examples of such heavy metal cation-contaminated foods include, but are not limited to, fish, wine, water and the like. Purified RG-II can also be used as an antidote and a treatment for specific heavy metal cation poisoning in humans and animals by virtue of the ability of the RG-II to complex specific heavy metal cations present in plasma and tissues. Since RG-II is not metabolically degraded or digested by higher animals, the resultant complexes formed between toxic cations and RG-II are naturally eliminated from the body.

In cases of heavy metal poisoning, the invention also contemplates an ex vivo method of removing specific heavy metal cations from the plasma of a human or animal patient suffering from the poisoning. According to this method, the patient's plasma is exposed ex vivo either to dimeric RG-II, or to monomeric RG-II in the presence of boric acid, such that a cation-RG-II complex is formed. The resultant cation-RG-II complexes are removed by filtration or chromatographic methods known in the art, prior to restoring the detoxified plasma into the patient. In other embodiments of this method, plasma from a patient with heavy metal cation poisoning is exposed ex vivo to RG-II, e.g., dimeric RG-II- B, immobilized on a solid support, such that specific cations are sequestered from the plasma for binding with high affinity to the dRG-II-B affixed to the solid support, rendering the plasma free of the toxic heavy metal cations. This method finds particular utility in cases of contamination from nuclear plants producing high levels of toxic radionuclides, such as in the Chernobyl explosion, the Three Mile Island mishap, etc.

RG-II can be used either in purified form or as a partially purified preparation from plants. Purified RG-II can be isolated from a plant source or produced by recombinant genetic technology and then purified to homogeneity; partially purified RG-II is isolated from a plant source but not purified to homogeneity. For example, purified RG-II preparations would be administered in patients for human and animal blood applications. For treating contaminated food and water sources, it would be more economical and sufficient to use partially purified preparations of RG-II from plants. RG-II is not easily degraded and can be fed orally to adsorb specific toxic cations from the bloodstream into the gut and intestines and then it would be excreted. Additionally or alternatively, RG-II can be incorporated into processed food to bind up specific heavy metal cations in the food; the resultant RG-II-cation complexes would pass through the body following ingestion.

Pectin preparations derived from plant sources are well-known commercially. These pectin preparations are known to bind cations due to the large number of negative charges on the polygalacturonic acid residues. However, in contrast to RG-II, pectin binds cations nonselectively and at a much lower affinity than does RG-II [Schlemmer (1986) Z. Lebensm. Unters 183:339–343]. Thus, the complexation of specific heavy metal cations by RG-II is distinguished from and unrelated to the general complexes formed between cations and pectins.

A further use of RG-II is found in bioremediation. Plants having high levels of RG-II can be used for remediation of soils and waters contaminated with specific heavy metal cations. Typically, monocots have about 0.1% of their cell walls as RG-II; dicots have between 1–3%. Since the RG-II content in plants can be accurately and easily measured based on the presence of sugars unique to RG-II (e.g., apiose, aceric acid, etc.), preferred plant species can be selected, based on the RG-II content of the plant cell walls, for such a role in bioremediation. Selection for high RG-II content is performed in a breeding population. There exist plants known in the art as "hyperaccumulators," which accumulate high levels of toxic metals [Brooks and Malaise (1985) supra; Cunningham et al. (1996) Plant Physiol. 110:715–719].

In addition, the present invention provides a method of bioremediation of soils and waters contaminated with toxic specific heavy metal cations. In a particular embodiment, plants, selected for their ability to produce high levels of RG-II, are grown in heavy metal cation-contaminated regions. These plants readily take up from soil or water specific multivalent heavy metal cations which are complexed with RG-II in the plant cell wall. Plants, such as algae, etc., are useful for cleaning up cation-contaminated waters, whereas plants, as exemplified by dicots, are particularly utilized to clean up contaminated soils.

The following examples use many techniques well-known and accessible to those skilled in the arts of plant biochemistry. It will be apparent to those of ordinary skill in the art that alternative methods, reagents, procedures and techniques other than those specifically detailed herein can be employed or readily adapted to practice the methods of making and of using the complexes of the present invention. In particular, variations of the RG-II preparations, of the cations to be complexes and of the chemical reactions underlying the complexation formation are all deemed a part of the invention, accessible to those skilled in the art based upon the examples of the invention herein described. Such alternative methods, reagents, procedures and techniques are within the spirit and scope of this invention.

All references cited in the present application are expressly incorporated by reference herein.

The methods and compositions of this invention are further illustrated in the following non-limiting Examples. All abbreviations used herein are standard abbreviations in the art. Specific procedures not described in detail in the Examples are well-know in the art. Any variations in the exemplified compositions and methods which occur to the skilled artisan are intended to fall within the scope of the present invention.

EXAMPLES

Example 1

Isolation of RG-II from Plant Sources.

(a) Purification of RG-II from Sycamore

Sycamore RG-II was isolated from the cell walls of suspension-cultured sycamore (*Acer pseudoplatanus*) cells by the action of an endopolygalacturonase (EPG) isolated from *Colletotrichum lindemuthianum*, as described in Darvill et al. (1978) Plant Physiol. 62:418–422; Marfa et al. (1991) Plant J. 1:217–225; York et al. (1985) Methods Enzymol. 118:3–40. At least 90% of the RG-II present in the sycamore walls was solubilized by the EPG treatment.

(b) Purification of RG-II from Pea

Pea RG-II was solubilized by EPG treatment of the walls isolated from etiolated pea stems and then purified by size exclusion chromatography (SEC) on a Bi-Gel P-100 column (1.2×100 cm). EPG treatment solubilizes at least 90% of the RG-II present in walls of the pea stems.

(c) Large Scale Purification of RG-II from Red Wine

Red wine (600 L) obtained after fermentation of mature Carignan noir grapes harvested in 1991 at the INRA-Pech Rouge/Narbonne Experimental Station was concentrated to 25 L by ultrafiltration (20 kDa cut off). Total colloids were precipitated by the addition of five volumes of cold ethanol (4° C.) to the concentrated wine. The precipitate (296 g) was then dissolved in water and dialysed. The solution of wine polysaccharides in water was adjusted to pH 4.6 by the addition of sodium citrate (final concentration 40 mM) and fractionated in 9 portions on a DEAE-Macroprep column (5×80 cm; Bio-Rad, USA) equilibrated at 20 mL/min in 40 mM sodium citrate buffer pH 4.6. Bound polysaccharides were eluted by stepwise addition of NaCl (1 L/step; 10, 50, 150, 250 mM in starting buffer). Two main RG-II-containing fractions were recovered at 10 (fraction A) and 50 (fraction B) mM NaCl. The RG-II from both fractions A and B was then separated from high molecular weight polysaccharides by size-exclusion chromatography on a Sephacryl S-400 HR column (5×80 cm; Pharmacia) equilibrated at 7 mL/min in 50 mM sodium acetate buffer (pH 5) containing 50 mM NaCl or on a Sephacryl S-200 HR column (1.6×95 cm; Pharmacia) equilibrated in the same buffer. The isolated wine RG-II samples represented 13.2 and 13.7 g for fractions A (dimer) and B (monomer), respectively (FIG. 2D).

Glycosyl-residue compositions were determined by GC analysis of the per-O-trimethylsilylated methyl glycosides. The TMS derivatives were separated on fused-silica DB-1 capillary columns and identified by CI-MS.

(d) Homogeneity and molecular weight determinations of RG-II samples

All RG-II samples were subjected to High Resolution Size Exclusion Chromatography (HR-SEC) on a Superdex-75® column (1×30 cm; Pharmacia) equilibrated at 0.6 mL/min in 25 mM ammonium formate pH 5.2. The eluant was monitored by differential refractometry. The column void volume is at ~14 min and the included volume is at ~34 min. The Sycamore RG-II preparations resolved into two components, peaks A and B (FIGS. 2A–2D) that could be isolated directly from the Superdex-75 eluant. Red wine fraction II eluted as a single peak with a retention time similar to that of peak B while fraction III corresponded at 90% to peak A (FIG. 3A–3C).

Matrix-assisted Laser Desorption/Ionization Time of Flight Mass Spectrometry (MALDI-TOF MS) was performed on a Hewlett Packard LDI 1700XP mass spectrometer operated in the positive ion mode at 30 kV accelerating voltage and a pressure of $~6\times 10^{-7}$ torr. The mass spectrometer was calibrated with a mixture of malto-oligosaccharides. An aqueous solution of RG-II (10 mg/mL) was diluted 1:5 in aqueous 50% acetonitrile containing 100 mM, 2,5-dihydroxybenzoic acid and 30 mM 1-hydroxyisoquinoline. Samples were desorbed/ionized from the probe tip with a nitrogen laser (1=337 nm) having a pulse width of 3 ns and delivering approximately 17 mJ of energy/laser pulse. MALDI-TOF MS showed that the component in peak A had a molecular weight of 9.8 kDa whereas peak B contained a molecule of ~4.8 kDa. The latter value is close to the calculated molecular weight from the model given in FIG. 1.

(e) Composition analysis of isolated RG-II samples

Inductively-Coupled-Plasma Atomic-Emission Spectroscopy (ICP-AES) was performed with a Jarrell-Ash 965 Atomcomp Plasma Emission spectrometer. Samples (3–5 mg/mL in water) were injected into the nebulizer of the spectrometer and analyzed according to the manufacturer instructions. ICP-AES analysis showed that the dimers of RG-II contain between one to two moles of boron (B) per molecule of dimer whereas only traces of B could be detected in the monomer.

$^{11}$B-NMR spectroscopy performed with a Bruker AMX 500 spectrometer operating at 160.467 MHz showed that the RG-II dimer preparations (sycamore peak A and wine RG-II fraction III) contained a signal at δ-9.6 ppm (relative to boric acid at δ-0.0 ppm) characteristic of borate-diol esters (FIG. 3A–3C). This signal was absent in the RG-II monomer preparations. Thus, the dimers of RG-II were characterized by the presence of borate-diol ester bond that can cross-link two RG-II molecules.

Glycosyl-linkage compositions were determined by GC-EIMS of the partially methylated alditol acetates. Wine RG-II fractions II and III were methylated with sodium methyl sulfinyl anion and methyl iodide prior to carboxyl-reduction of their uronosyl groups using lithium triethyl-borodeuteride (Superdeuteride®, Aldrich) and hydrolysis, reduction and acetylation. Partially methylated alditol acetates were analyzed on fused-silica DB-225 and DB-1 capillary columns. Glycosyl-linkage compositions of monomeric and dimeric RG-II from red wine were in accordance with the molecular model given in FIG. 1. The only difference observed between both forms of the molecule was the presence of fully substituted 2,3,3'-linked apiosyl residues in the dimer that were absent in the monomer. This data indicated that the borate-diol esters are most likely to be located on C-2 and C-3 of at least one apiosyl residue of the R molecule (FIG. 6). Glycofuranoses are known to form stable borate esters and apiose is the only furanosyl residue with free vicinal cis-diol.

ICP-AES analysis of all the RG-II preparations (monomeric and dimeric RG-II from sycamore cells, pea stems and red wine) revealed the presence of several elements. Some of these elements (Al, Ca, K, Mg, Mn, Na and Zn) are commonly associated to polysaccharide samples and were present in similar proportions in both monomers and dimer preparations. Other elements, more unusual in plant polysaccharide preparations, were found in the RG-II dimers whereas they were not detected or present as traces in the mRG-II samples. The elements specifically bound to the dimers were barium (Ba), strontium (Sr) and lead (Pb).

Example 2

RG-II-Borate Complexes.

(a) Hydrolysis of RG-II dimer; Stability of the dimer

A solution of dimeric RG-II was incubated at pH 1.6 at room temperature. HR-SEC analysis on the Superdex-75 HR column showed that the dimer (eluted at ~18.5 min) was hydrolysed into monomer (eluted at ~20.5 min). The relative proportions of monomeric (mRG-II) and dimeric RG-II (dRG-II) were determined by integration of their respective peaks. The rate of hydrolysis was pH-dependent. For instance 50% monomer was obtained after 30 minutes of incubation at pH 1.6, 24 hours were required to get the same hydrolysis at pH 2.4. The dimer was stable at pH>3.

No monosaccharide could be detected in the incubation medium, suggesting that the formation of monomeric RG-II did not result from the hydrolysis of a glycosidic bond in the molecule.

(b) Hydrolysis of Borate Esters of RG-II dimer

Solutions of RG-II (0.5 mM) in 50 mM HCl/KCl (400 µl) at pH 1.0, 1.5, and 2.2, in 50 mM citrate/potassium phosphate (400 µl) at pH 3.0, 4.0, 5.0 and 7.0, in 50 mM glycine/NaOH (400 µl) at pH 9, and in 50 mM NaOH/KCl (400 µl) at pH 12 were kept at room temperature for 30 minutes and for 24 hours. Portions (200 µl) of each reaction mixture were then subjected to SEC with refractive index detection, and the relative proportions of mRG-II and dRG-II-B were determined by integration of their respective peaks.

(c) Formation of Dimeric RG-II in the presence of Boric Acid

A solution of red wine mRG-II (0.5 mM) in 2.8 ml of HCl/KCl, pH 1, containing boric acid (1.2 mM) was kept at room temperature for 30 min. The reaction mixture was then divided into seven equal portions (400 µl each) that were variously adjusted to pH 1.5, 2.1, 2.8, 3.2, 3.9, 5.3, or 8.6 by the addition of dilute NaOH. The pH values of the solutions, which changed by only ±0.1 pH unit during the reactions, were determined with a micro-combination pH electrode (Microelectrode Inc., Londonderry, N.H.) and an Accumet 950 pH meter (Fisher). The reaction mixtures were kept at room temperature for 24 and 72 hours then the portions (200 µl) were separated by SEC. In a second experiment, separate solutions of red wine mRG-II (0.5 mM) in 50 mM K+ hydrogen phthalate/HCl (200 µl) containing boric acid (1.2 mM) at pH 2.2, 2.7, 2.9, 3.1, 3.3, 3.5, 3.7, and 3.9 were kept at room temperature for 24 hours and then separated by SEC. The relative proportions of mRG-II and dRG-II-B were determined by integration of their respective peaks.

(d) Formation of Dimeric RG-II in the Presence of Multivalent Cations

A 0.5 mM solution of red wine mRG-II was incubated at room temperature in 50 mM potassium hydrogen phthalate/

HCl pH 3.3, containing 1.2 mM boric acid and 0.5 mM of either $BaC_2$, $CaCl_2$, $CdCl_2$, $CuCl_2$, $MgCl_2$, NaCl, $NiCl_2$, $Pb(NO_3)_2$, $SrCl_2$ or $Zn(NO_3)_2$. To assay the pH range required for the dimer formation, the pH of 50 mM potassium hydrogen phthalate was adjusted to 2.5, 3.0, 3.5 and 3.9 by the addition of HCl and to 4.5, 5.0, 5.6 and 6.7 by the addition of NaOH. The apparition of dRG-II after 24 hours of incubation was followed by HR-SEC analysis of the Superdex-75 HR column. The relative proportions of monomeric and dimeric RG-II were determined by integration of their respective peaks. The formation of dimeric RG-II in the presence of boric acid and either $AlCl_3$, $LaCl_3$, or $PrCl_3$ (0.5 mM) was determined in an identical manner.

To determine the effect of pH on the formation of dRG-II-B in the presence of $SrCl_2$ or $Pb(NO_3)_2$, solutions (200 μl) containing red wine mRG-II (0.5 mM), boric acid (1.2 mM), and either $SrCl_2$ (0.5 mM) or $Pb(NO_3)_2$ (0.5 mM) in 50 mM KCl/HCl, pH 1.2 and 2.1, in 50 mM $K^+$ hydrogen phthalate/HCl, pH 2.5, 3.0, 3.5, and 3.9 and 50 mM $K^+$ hydrogen phthalate/NaOH, pH 4.5, 5.0, 5.6, and 6.7, were kept at room temperature for 24 hours. The reaction mixture was then separated by SEC, and the relative proportions of mRG-II and dRG-II-B were determined by integration of their respective peaks.

The effect of divalent cations on the hydrolysis and regeneration of dRG-II-B was determined by treating sycamore RG-II (0.35 mM), which is a mixture of mRG-II and dRG-II-B, at room temperature for 40 minutes in 50 mM HCl/KCl (1.2 ml), pH 1. This treatment converts all the dRG-II-B to mRG-II and boric acid. The solution was adjusted to pH 3.7 by the addition of dilute NaOH and then divided into six 200-μl portions, and $SrCl_2$, $CaCl_2$, $BaCl_2$, $Pb(NO_3)_2$, or $CuCl_2$ was added to give a final concentration of 0.5 mM divalent cation. No boric acid was added since sycamore RG-II contains ~1 μg boron/mg. A control sample contained no added divalent cation. The reaction mixtures were kept at room temperature for 24 hours, and the amount of dRG-II-B formed was then determined by SEC. In a second experiment, the pH of the reaction mixture was adjusted to pH 5.3 rather than pH 3.7, and the procedures were repeated.

(e) Determination of the Amount of Divalent Cations Bound to Dimeric R formed from Monomeric RG-II, Boric Acid and Cations Separate solutions of mRG-II (0.9 mM) in 50 mM $K^+$ hydrogen phthalate (500 μl), pH 3.8, containing boric acid (2 mM) and $SrCl_2$, $Pb(NO_3)_2$, or $BaCl_2$ (2 mM) were kept at room temperature for 24 hours. Each solution was dialyzed (1000 molecular weight cut-off tubing) in a separate container against deionized water and then eluted through a column (1×2 cm) containing Chelex®100 (Bio-Rad) cation exchange resin ($Na^+$ form). dRG-II-B was shown, by SEC, to account for 95% of the RG-II. The solutions were freeze-dried and then analyzed by inductively coupled plasma atomic emission spectrometry (ICP-AES). The amount of divalent cation that bound to mRG-II was determined by treating 500-μl solutions of mRG-II (0.9 mM) in 50 mM $K^+$ hydrogen phthalate, pH 3.8, at room temperature for 24 hours with $SrCl_{21}$ $Pb(NO_3)_2$, or $BaCl_2$ (2 mM). The solutions were dialyzed, treated with Chelex®100 resin, and then analyzed by ICP-AES.

(f) The Binding of Specific Cations by Dimeric RG-II

Dimeric RG-II is incubated at room temperature in 50 mM potassium hydrogen phthalate/HCl, pH 3.5, containing 0.5 mM of a multivalent cation such as $AlCl_3$, $BaCl_2$, $CaCl_2$, $CdCl_2$, $Ce(NO_3)_3$, $Ce(SO_4)_2$, $CuCl_2$, $Eu(NO_3)_3$, $Hg(NO_3)_2$, $HgCl_2$, $MgCl_2$, NaCl, $NiCl_2$, $Pb(NO_3)_2$, $SbCl_3$, $SnCl_2$, $SrCl_2$ or $Zn(NO_3)_2$ in the presence and in the absence of 1.2 nM boric acid. After 24 hours of incubation, the solution is dialyzed exhaustively and subjected to ICP-AES analysis to confirm the cation complexation by the RG-II dimer.

Also, a dimeric RG-II preparation is tested for its ability to bind multivalent cations at pH 5. Dimeric RG-II (K204A) isolated from red wine was incubated at pH 5 (water) for 24 hours at room temperature in the presence of 5 mM divalent cations such as $Ca^{2+}$, $Cd^{2+}$, $Pb^{2+}$, $Sr^{2+}$, $Zn^{2+}$ and $Cu^{2+}$. After incubation, the sample was analyzed for metal content by ICP-AES.

(g) Displacement of Specific Cations from dRG-II-B

The amount of $Sr^{2+}$ bound in a naturally occurring $Sr^{2+}$-dRG-II-B complex of Californian red wine was determined by ICP-AES and found to be approximately 0.35 moles $Sr^{2+}$ per mole dRG-IIB. Individual samples of dRG-II-B (approximately 2 mg) were treated at pH 5 with salt solutions (5 mM) of $Zn^{2+}$, $Cu^{2+}$, $Cd^{2+}$, $Ca^{2+}$, $Pb^{2+}$ and $Ba^{2+}$. All salt solutions were chloride except $Pb(NO_3)_2$. After incubation for 24 hours at room temperature, each sample was dialyzed extensively and freeze-dried. The residual Sr content was determined for each sample.

Example 3

Uses of RG-II (a) The Use of RG-II to Assay for the Ability of a Cation to Form a Complex with a RG-II Dimer Cations that bind to dRG-II are characterized by the ability to induce the dimer formation in vitro. The dimer formation rate and yield is thus an easy way to assay the ability of cations to form complexes with RG-II dimers.

A 0.5 mM solution of red wine mRG-II (fraction II) was incubated at room temperature in 50 mM potassium hydrogen phthalate/HCl pH 3.5, containing 1.2 mM boric acid and 0.5 mM of either $AlCl_3$, $BaCl_2$, $CaCl_2$, $CdCl_2$, $Ce(NO_3)_3$, $Ce(SO_4)_2$, $CuCl_2$, $Eu(NO_3)_3$, $Hg(NO_3)_2$, $HgCl_2$, $LaCl_3$, $MgCl_2$, NaCl, $NiCl_2$, $Pb(NO_3)_2$, $PrCl_3$, $SbCl_3$, $SnCl_2$, $SrCl_2$, or $Zn(NO_3)_2$. The formation of dRG-II after 24 hours of incubation was followed by HR-SEC analysis on the Superdex-75 HR column. The relative proportions of monomeric and dimeric RG-II were determined by integration of their respective peaks. An increase in the ratio of dimer to monomer RG-II correlates with the ability of the cation to form complexes with dimeric RG-II.

(b) The Use of RG-II to Detoxify Liquids (i) Direct Removal of heavy metal cations (e.g., lead) from wine Six wine samples were obtained from the following varieties of *Vitis vinifera*: Carignan Noir, Merlot, Grenache noir, Muscat d'Alexandrie, Chardonnay and Sauvignon. Wine samples were concentrated two times by rotary evaporation. Concentrated wines (15 mL) were applied on a 2.6×10 cm column of Relite® Diaion® SP411 polystyrene-divinylbenzene resin equilibrated at 25 ml/h in water. The unretained fraction was analyzed both for polysaccharide and lead content. Analysis of the polysaccharide profile on Superdex-75 HR and of the sugar composition of the unretained fractions showed that RG-II (mainly in the dimeric form) had been quantitatively adsorbed on the resin. Lead contents were determined by SAA on a Varian AA-1275 spectrometer. Each unretained fraction on the adsorption polystyrene-divinylbenzene resin contained less than 10% of the initial lead content in the corresponding wine (Table 6). Thus lead is associated with dRG-II in wines and the quantitative removal of RG-II from a wine by adsorption chromatography allows an equivalent elimination of the lead content.

In an alternate procedure, lead can be removed from wine by adsorption of the RG-II dimer-lead complex on activated charcoal. Activated charcoal Norit® CA+ was added at 50 g/L to a red wine obtained from Merlot grapes (lead content: ~70 µg/L). Superdex-75 HR chromatography indicated that RG-II had been quantitatively removed from the wine. Lead content analysis by SAA confirmed that 99% of the lead had been removed by adsorption of the dRG-II-lead complex on the activated charcoal (Table 7).

Alternatively, lead can be removed from wine by ultrafiltration of the dimeric RG-II-lead complex. A red wine sample obtained from Merlot grapes (lead content: ~70 µg/L) was submitted to ultrafiltration on a Centricon 30 ultrafiltration membrane (Amicon, MWCO 20 kDa). The lead content of the filtrate represented less than 1% of the initial content of the wine (Table 7) indicating that the dRG-II-lead complex had been quantitatively removed. This removal was confirmed by Superdex-75 HR chromatography analysis.

Lead can also be removed from wine by anion-exchange chromatography of the RG-II dimer-lead complex. Dowex 1X2-400, a basic anion-exchanger resin (Sigma, Cl$^-$ form) was added at 50 g/L to a red wine obtained from Merlot grapes (lead content: ~70 µg/L). Superdex-75 HR chromatography and lead content analysis of the wine by SAA indicated that ~40% of the RG-II-lead complex had been removed by anion-exchange chromatography (Table 7).

(ii) Removal of heavy metal cations (e.g., lead) from wine or other contaminated solutions by addition of both monomeric RG-II and boric acid followed by removal of the complex formed.

Both mRG-II (final concentration 2.5 g/L) and boric acid (final concentration 1.2 mM) were added to a 0.4 mM Pb(NO$_3$)$_2$ solution (or some other solution contaminated with lead) in 50 mM potassium hydrogen phthalate/HCl pH 3.5 (Solution A). The solution A was incubated 24 hours at 25° C. to obtain a complete dimerization of mRG-II. The RG-II dimer-lead complex was then removed quantitatively with either:

Adsorption chromatography on a 2.6×10 column of Relite® Diaion® SP411 polystyrene-divinylbenzene resin equilibrated at 25 ml/h in water.

Adsorption on activated charcoal Norit® CA+ at 50 g/L.

Ultrafiltration on a Centricon 30 ultrafiltration membrane (MWCO 20 kDa).

Anion-exchange chromatography on Dowex 1X2-400 (Cl$^-$ form).

All four procedures allowed the removal of more than 85% of lead from the contaminated solution in the form of RG-II dimer-lead complex formed.

(iii) Removal of heavy metal cations (e.g., lead) from contaminated solutions by addition of dimeric RG-II followed by removal of the dRG-II-lead complex formed.

Dimeric RG-II (final concentration 100 mg/L) was added to a 6.6 µM Pb(NO$_3$)$_2$ solution (or some other solution contaminated with lead) in 50 mM potassium hydrogen phthalate/HCl pH 3.5 (Solution B). The solution B was incubated 24 hours at 25° C. and the dRG-II-lead complex was removed quantitatively from solution with either:

Adsorption chromatography on a 2.6×10 column of Relite® Diaion® SP411 polystyrene-divinylbenzene resin equilibrated at 25 ml/h in water.

Adsorption on activated charcoal Norit® CA+ at 50 g/L.

Ultrafiltration on a Centricon 30 ultrafiltration membrane (MWCO 20 kDa).

Anion-exchange chromatography on Dowex 1X2-400 (Cl$^-$ form).

For all procedures used to remove the complex from the solution, the elimination of lead from the solution was directly proportional to the removal of dRG-II (Table 7), ultrafiltration being the more efficient means of complex removal. In control experiments, these procedures for removal of complexes from solution were applied to the 6.6 µM Pb(NO$_3$)$_2$ solution in 50 mM potassium hydrogen phthalate/HCl pH 3.5 in absence of mRG-II or dRG-II (Solution C) and under these control conditions less than 50% of the lead was removed (Table 6).

Example 4

Analytical Methods

The glycosyl residue compositions of sycamore, pea, and red wine RG-II were determined by GLC analysis of their trimethylsilyl methyl glycoside (methyl ester) derivatives. The glycosyl-linkage compositions of mRG-II and dRG-II-b (generated by treating red wine mRG-II (2.5 mM) for 24 hours with boric acid (5 mM) at pH 3.2) were determined by GLC-MS. Apiose was obtained by hydrolyzing 1,2-3,5-diisopropylidene apiose (5 mg, Sigma) at 80° C. for 30 minutes in 2M trifluoroacetic acid. The resulting apiose was reduced with NaBD$_4$ and acetylated prior to analysis by GLC-MS.

$^{11}$B NMR spectroscopy was performed with a Bruker AMX 500 spectrometer operating at 160.4 MHz with a Z-Spec broad-band inverse-detection probe (Nalorac Cryogenics Corp., Martinez, Calif.) and a 10-µs pulse width. Solutions (500 µl) of RG-II (2–4 mM) in D$_2$O (99.9%) were analyzed in quartz NMR tubes (507-PP8QTZ, Wilmad Glass Co., Buena, N.J.). The formation at pH 3.4 of dRG-II-B from mRG-II and boric acid was monitored using time-resolved $^{11}$B NMR spectroscopy by accumulating 1200 free induction decays (20 min total acquisition time) at 3-hour intervals over a period of 24 hours. All chemical shifts (δ) are reported in ppm relative to external boric acid (δ 0.0 ppm).

MALDI-TOF MS was performed with a Hewlett-Packard LDI 1700XP mass spectrometer operated in the positive ion mode at 30 kV with a pressure of 6×10$^{-7}$ torr. Solutions (0.5 µl) of RG-II (2 µg/µl) in aqueous 50% acetonitrile containing 100 mM 2,5-dihydroxybenzoic acid and 30 mM 1-hydroxyisoquinoline [Mohr et al. (1995) Rapid Commun. Mass Spectrum 9:809–814] were applied to the probe tip of the MS and dried under vacuum. Sample were desorbed from the probe tip with a nitrogen laser (λ337 nm) having a pulse width of 3 ns and delivering ~16 µJ of energy/laser pulse.

The anion and cation compositions of mRG-II and dRG-II-B were determined, according to the manufacturer's instructions, with a Jarrell-Ash 965 Atomcomp plasma emission spectrograph.

We claim:

1. A method for dimerization of rhamnogalacturonan-II comprising the step of incubating monomeric rhamnogalacturonan-II in the presence of boric acid at a pH between approximately 2.2 and 4.5 such that a borate ester crosslinked dimer of rhamnogalacturonan-II is formed.

2. The method for dimerization of claim 1 wherein said borate ester is a 1:2 borate-diol ester.

3. The method for dimerization of claim 1 wherein said dimer of rhamnogalacturonan-II has a molecular weight of between approximately 6 to approximately 10 kDa.

4. The method for dimerization of claim 1 wherein said pH is between 2.8 and 3.7.

5. The method for dimerization of claim 1 wherein said step of incubation is carried out in the presence of a heavy metal cation capable of complexation with said rhamnogalacturonan-II.

6. The method of dimerization of claim 5 wherein said heavy metal cation comprises physical and chemical properties selected from the group consisting of (a) a valence of 2+ or 3+, (b) a crystal ionic radius of >0.9 Å, (c) an electronic configuration with an incompletely filled subshell and (d) an ionic potential that is 1.79 or less for cations of valence 2+ or 3.16 or less for cations of valence 3+.

7. The method of dimerization of claim 5 wherein said heavy metal cation is selected from the group consisting of $Ba^{2+}$, $Ce^{3+}$, $Eu^{3+}$, $La^{3+}$, $Pb^{2+}$, $Pr^{3+}$, and $Sr^{2+}$.

8. A method for complexation of a heavy metal cation with a rhamnogalacturonan-II dimer comprising the step of incubating said heavy metal cation with said rhamnogalacturonan-II dimer at a pH between approximately 2.2 and 6.5 such that a complex comprising said heavy metal cation and said rhamnogalacturonan-II dimer is formed.

9. The method for complexation of claim 8 wherein said rhamnogalacturonan-II dimer is a borate ester crosslinked dimer.

10. The method for complexation of claim 8 wherein said rhamnogalacturonan-II dimer is formed from monomeric rhamnogalacturonan-II in the presence of boric acid in said incubation step.

11. The method of complexation of claim 8 wherein said heavy metal cation comprises physical and chemical properties selected from the group consisting of (a) a valence of 2+ or 3+, (b) a crystal ionic radius of >0.9 Å, (c) an electronic configuration with an incompletely filled subshell and (d) an ionic potential that is 1.79 or less for cations of valence 2+ or 3.16 or less for cations of valence 3+.

12. The method for complexation of claim 8 wherein said heavy metal cation is selected from the group consisting of $Ba^{2+}$, $Ce^{3+}$, $Eu^{3+}$, $La^{3+}$, $Pb^{2+}$, $Pr^{3+}$, and $Sr^{2+}$.

13. The method for complexation of claim 8 wherein said complex comprises approximately 1 mole of divalent cation or approximately 2 mole of trivalent cation per mole of rhamnogalacturonan-II dimer.

14. The method for complexation of claim 8 wherein said pH is between approximately 3.0 and 5.0.

15. A cation-rhamnogalacturonan-II dimer complex consisting of a multivalent heavy metal cation and a purified rhamnogalacturonan-II dimer wherein said cation is chemically associated with said rhamnogalacturonan-II dimer.

16. The cation-rhamnogalacturonan-II dimer complex of claim 15 wherein said rhamnogalacturonan-II dimer is a borate ester crosslinked dimer.

17. The cation-rhamnogalacturonan-II dimer complex of claim 15 wherein said multivalent heavy metal cation comprises physical and chemical properties selected from the group consisting of (a) a valence of 2+ or 3+, (b) a crystal ionic radius of >0.9 Å, (c) an electronic configuration with an incompletely filled subshell and (d) an ionic potential that is 1.79 or less for cations of valence 2+ or 3.16 or less for cations of valence 3+.

18. The cation-rhamnogalacturonan-II dimer complex of claim 15 wherein said heavy metal cation is selected from the $Ba^{2+}$, $Ce^{3+}$, $Eu^{3+}$, $La^{3+}$, $Pb^{2+}$, $Pr^{3+}$, and $Sr^{2+}$.

19. A cation-rhamnogalacturonan-II dimer complex comprising a divalent heavy metal cation or a trivalent heavy metal cation and a purified rhamnogalacturonan-II dimer wherein said cation is chemically associated with said rhamnogalacturonan-II dimer wherein said complex comprises approximately 1 mole of said divalent cation or approximately 2 moles of trivalent cation per mole of said rhamnogalacturonan-II dimer.

20. An assay method for detection of a heavy metal cation having an ability to form a complex with rhamnogalacturonan-II dimer comprising the steps of:
(a) incubating monomeric rhamnogalacturonan-II and boric acid in the presence or absence of said heavy metal cation at a pH between approximately 2.2 to 6.5 for a time sufficient to form a complex comprising said heavy metal cation and said rhamnogalacturonan-II dimer; and
(b) determining the ratio of dimeric rhamnogalacturonan-II to monomeric rhamnogalacturonan-II after said incubation of step (a) said ratio correlating with the ability of said heavy metal cation to form a complex with said rhamnogalacturonan-II dimer.

21. The assay method of claim 20 wherein said pH is between approximately 3.0 and 5.0.

22. A method of removal of a multivalent heavy metal cation from a medium contaminated with said heavy metal cation comprising the steps of:
(a) incubating said medium with rhamnogalacturonan-II dimer at a pH between approximately 2.2 and 4.5 such that a complex comprising said heavy metal cation and said rhamnogalacturonan-II dimer is formed; and
(b) removing said complex from said medium such that said medium is reduced or free of said heavy metal cation.

23. The method of removal of claim 22 wherein said rhamnogalacturonan-II dimer is formed from monomeric rhamnogalacturonan-II in the presence of boric acid in said incubation step (a).

24. The method of removal of claim 22 wherein said multivalent heavy metal cation comprises physical and chemical properties selected from the group consisting of (a) a valence of 2+ or 3+, (b) a crystal ionic radius of >0.9 Å, (c) an electronic configuration with an incompletely filled subshell and (d) an ionic potential that is 1.79 or less for cations of valence 2+ or 3.16 or less for cations of valence 3+.

25. The method of removal of claim 22 wherein said heavy metal cation is selected from the group consisting of $Ba^{2+}$, $Ce^{3+}$, $Eu^{3+}$, $La^{3+}$, $Pb^{2+}$, $Pr^{3+}$, and $Sr^{2+}$.

26. The method of removal of claim 22 wherein said removal step (b) comprises adsorption or anion-exchange chromatography.

27. The method of removal of claim 26 wherein said removal step (b) comprises adsorption chromatography using a polystyrene-divinylbenzene resin or activated charcoal.

28. The method of removal of claim 22 wherein said removal step (b) comprises filtration.

29. A pharmaceutical composition comprising an amount of purified rhamnogalacturonan-II dimer effective for complexation of heavy metal cations to treat a condition of heavy metal poisoning, boric acid, and a pharmaceutically acceptable carrier.

30. A method for treatment of heavy metal cation poisoning comprising the step of administering into a human or animal having heavy metal cation poisoning an effective amount of purified rhamnogalacturonan-II dimer such that a complex is formed between said heavy metal cation and said rhamnogalacturonan-II dimer and such that said complex is eliminated from said human or animal, rendering said human or animal free of said heavy metal cation poisoning.

31. The method for treatment of heavy metal cation poisoning of claim 30 wherein said rhamnogalacturonan-II dimer is a purified borate ester crosslinked dimer of rhamnogalacturonan-II.

32. The method for treatment of heavy metal poisoning of claim 30 wherein said rhamnogalacturonan-II dimer is administered as a purified rhamnogalacturona-II monomer in the presence of boric acid.

33. A method for ex vivo treatment of heavy metal cation poisoning comprising the steps of:
(a) administering into the plasma of a human or animal patient having heavy metal poisoning an effective amount of purified rhamnogalacturonan-II dimer such that a complex is formed between said heavy metal cation and said rhamnogalacturonan-II dimer; and
(b) removing said complex from said plasma prior to restoring said plasma to said patient, rendering said patient free of said heavy metal cation poisoning.

34. The method for ex vivo treatment of claim 33 wherein said rhamnogalacturonan-II dimer is a purified borate ester crosslinked dimer of rhamnogalacturonan-II.

35. The method for treatment ex vivo treatment of claim 33 wherein said rhamnogalacturonan-II dimer is administered as a purified rhamnogalacturona-II monomer in the presence of boric acid.

36. The method for ex vivo treatment of claim 33 wherein said rhamnogalacturonan-II is immobilized on a solid support.

37. A method of detoxifying a heavy metal cation-contaminated food used for human and/or animal consumption comprising the step of treating said heavy metal cation-contaminated food with an effective amount of rhamnogalacturonan-II dimer at a pH between approximately 2.2 and 6.5 such that a complex is formed between said heavy metal cation and said rhamnogalacturonan-II dimer, rendering said food detoxified of said heavy metal cation.

38. The method of detoxifying of claim 37 wherein said contaminated food is treated with rhamnogalacturonan-II dimer which is administered as a monomer of rhamnogalacturonan-II in the presence of boric acid.

39. The method of claim 37 wherein said heavy metal cation is $Pb^{2+}$.

40. A chemical reagent useful for complexation and/or decontamination of a heavy metal cation from water or soil comprising rhamnogalacturonan-II dimer and, optionally, boric acid at a pH of between approximately 2.2 and 4.5.

41. A method for bioremediation of water or soil contaminated with a heavy metal cation comprising the step of growing a plant producing of rhamnogalacturonan-II dimer at said water or soil such that said heavy metal cation is taken up by said plant and a complex is formed between said heavy metal cation taken up by said plant and said rhamnogalacturonan-II dimer produced by said plant.

42. The method for bioremediation of claim 41 wherein said plant is grown in the presence of boric acid.

43. The method for bioremediation of claim 41 wherein said plant is a dicot.

44. The method of bioremediation of claim 41 wherein said plant is an alga.

45. A method for treatment of a human or an animal suspected of having consumed a heavy metal cation-contaminated food comprising the step of administering to said human or animal an effective amount of rhamnogalacturonan-II dimer at a pH between approximately 2.2 and 6.5 such that a complex is formed between said heavy metal cation and said rhamnogalacturonan-II dimer.

46. The method of claim 45 wherein said rhamnogalacturonan-II dimer is administered orally.

47. The method of claim 45 wherein said rhamnogalacturonan-II dimer is administered as a purified monomer of rhamnogalacturonan-II in the presence of boric acid.

48. The method of claim 45 wherein said heavy metal cation is $Pb^{2+}$.

49. The method of claim 45 wherein said rhamnogalacturonan-II dimer is a purified borate ester crosslinked dimer of rhamnogalacturonan-II.

50. A cation-rhamnogalacturonan-II dimer complex comprising a trivalent heavy metal cation and a purified rhamnogalacturonan-II dimer wherein said cation is chemically associated with said rhamnogalacturonan-II dimer.

* * * * *

UNITED STATES PATENT AND TRADEMARK OFFICE
CERTIFICATE OF CORRECTION

PATENT NO.   : 5,877,164

DATED        : March 2, 1999

INVENTOR(S)  : Malcolm A. O'Neill, et al.

It is certified that error appears in the above-identified patent and that said Letters Patent is hereby corrected as shown below:

Column 7, line 48, change "(dark bars)" to --(bars with diagonal lines--.

Column 7, line 48, change "(gray bars)" to --(white bars)--.

Signed and Sealed this

Fourth Day of May, 1999

*Attest:*

Q. TODD DICKINSON

*Attesting Officer*     Acting Commissioner of Patents and Trademarks

UNITED STATES PATENT AND TRADEMARK OFFICE
CERTIFICATE OF CORRECTION

PATENT NO. : 5,877,164

DATED : March 2, 1999

INVENTOR(S) : O'Neill et al.

It is certified that error appears in the above-identified patent and that said Letters Patent is hereby corrected as shown below:

At col. 7, line 24, rewrite "2C" as --2B--.
At col. 7, line 46, rewrite "5A" as --5B--.
At col. 7, line 62, rewrite "Dapiosyl" as --D-apiosyl--.

At col. 11, line 30, rewrite "$[M+Na]^+$" as --$[M+2Na]^+$--.

At col. 12, line 50, rewrite "(1-4" as --(1-4--.

At col. 14, Table 2, move lines 5-8 to below the Table and insert at approximately line 29 as a new footnote as follows:
--(f) All the solutions were dialyzed for 16 hours against deionized water. Each solution was eluted through a column (1 x 2 cm) containing Chelex® 100 cation exchange resin ($Na^+$ form). The eluants were then freeze-dried prior to ICP-AES analysis.--

UNITED STATES PATENT AND TRADEMARK OFFICE
CERTIFICATE OF CORRECTION

PATENT NO. : 5,877,164

DATED : March 2, 1999

INVENTOR(S) : O'Neill et al.

It is certified that error appears in the above-identified patent and that said Letters Patent is hereby corrected as shown below:

At col. 19, Table 7, last line of footnotes, rewrite "o fmRG-II" as --of mRG-II

At col. 19, line 39, rewrite "(Table 6)." as --(Table 7).--.
At col. 19, line 42, rewrite "nBioFactors" as --BioFactors--.

At col. 20, line 8, rewrite "acidor" as --acid or--.

At col. 22, line 15, rewrite "well-know" as --well-known--.

At col. 23, line 67, rewrite "(FIG. 6)." as --(FIG. 7).--.

At col. 28, line 10, rewrite "(Table 6)." as --(Table 7).--.

Signed and Sealed this

Twenty-fourth Day of August, 1999

Attest:

Q. TODD DICKINSON

*Attesting Officer*    *Acting Commissioner of Patents and Trademarks*